(12) United States Patent
Fredricks

(10) Patent No.: US 6,176,587 B1
(45) Date of Patent: Jan. 23, 2001

(54) METHOD AND APPARATUS FOR ADJUSTING VEHICLE MIRRORS

(76) Inventor: Ronald J. Fredricks, 2046 Foxboro NW., Grand Rapids, MI (US) 49504

( * ) Notice: Under 35 U.S.C. 154(b), the term of this patent shall be extended for 0 days.

(21) Appl. No.: 09/379,272

(22) Filed: Aug. 23, 1999

Related U.S. Application Data

(63) Continuation of application No. 08/818,628, filed on Mar. 14, 1997, now Pat. No. 5,993,015, which is a continuation-in-part of application No. 08/374,220, filed on Jan. 18, 1995, now Pat. No. 5,668,675.

(51) Int. Cl.[7] ............................. G02B 5/08; G02B 7/182; B60R 1/08
(52) U.S. Cl. ......................... 359/843; 359/872; 359/877; 359/900; 307/10.1; 340/540; 340/555; 340/556; 362/494; 701/49
(58) Field of Search ..................................... 359/843, 872, 359/877, 900; 307/10.1; 340/540, 555, 556; 362/494; 701/49

(56) References Cited

U.S. PATENT DOCUMENTS

| 4,625,329 | * | 11/1986 | Ishikawa et al. . | |
|---|---|---|---|---|
| 4,727,302 | * | 2/1988 | Mizuta et al. . | |
| 4,811,226 | * | 3/1989 | Shinohara et al. . | |
| 4,837,551 | * | 6/1989 | Iino . | |
| 4,843,892 | | 7/1989 | Krist ................................... | 73/865.4 |
| 5,668,675 | * | 9/1997 | Fredricks ........................... | 359/843 |
| 5,694,259 | * | 12/1997 | Brandin ............................. | 307/10.1 |
| 5,706,144 | * | 1/1998 | Brandin ............................. | 359/877 |
| 5,798,575 | | 8/1998 | O'Farrell et al. .................... | 307/10.1 |
| 5,949,592 | * | 9/1999 | Brandin ............................. | 359/872 |
| 5,993,015 | * | 11/1999 | Fredricks ........................... | 359/843 |

FOREIGN PATENT DOCUMENTS

| 63-31540 | * | 2/1987 | (JP) . |
| 62-61830 | * | 3/1987 | (JP) . |
| 62-234754 | * | 10/1987 | (JP) . |
| 62-286855 | * | 12/1987 | (JP) . |
| 2-106452 | * | 4/1990 | (JP) . |
| 3-153432 | * | 7/1991 | (JP) . |
| 3-284435 | * | 12/1991 | (JP) . |

* cited by examiner

*Primary Examiner*—Ricky D. Shafer
(74) *Attorney, Agent, or Firm*—Joseph F. Breimayer

(57) ABSTRACT

A method and apparatus for use in locating a vehicle driver, passenger or object in the vehicle for controlling vehicle systems including the positioning of vehicle sideview mirrors in relation to the driver's eyes to maximize the view of traffic on either side of the vehicle or the characteristics of vehicle airbag deployment. The location of a driver's or passenger's eyes or the location of an infant's seat is derived from the adjustment by the driver (or passenger, if capable of doing so) of adjustable light beam(s) emanating from light source(s) or illuminated indicia, until it (or they) intersect the driver's or passenger's eyes or illuminate a target, e.g. a child or an infant's seat, in the front passenger's seat. From the angles of adjustment of the light beam(s) and other known coordinates of the vehicle, the location of the driver's or passenger's eyes or the target may be computationally derived as a set of Cartesian coordinates. The determined eye location of the driver may be used together with the known mounting locations of the driver's and passenger's sideview mirror assemblies to derive exterior sideview mirror pitch and azimuth adjustment signal sets correlated to the vehicle blind spots. The adjustment signals are applied to servo motors operating in a feedback control loop to correct the actual driver's side and passenger's side sideview mirror pitch and azimuth settings to properly reflect images of the driver's side and passenger's side vehicle blind spots to the driver's eyes. The determined eye locations of the driver and passenger or the target location of the infant's seat may be also or alternatively employed in the control of the airbag deployment system and in other vehicle safety and comfort systems. The relative fore-aft distance away from the airbag and the height of the person or target can be computed, and airbag deployment force and/or duration adjusted to compensate for deviation from the standard height and fore-aft distance.

22 Claims, 12 Drawing Sheets

METHOD AND APPARATUS FOR ADJUSTING VEHICLE MIRRORS

This application is a continuation of co-pending U.S. patent application Ser. No. 08/818,628, filed Mar. 14, 1997, now U.S. Pat. No. 5,993,015 issued Nov. 30, 1999, which is a continuation-in-part of U.S. application 08/374,220 filed Jan. 18, 1995 now U.S. Pat. No. 5,668,675 issued Sep. 16, 1997.

BACKGROUND OF THE INVENTION

1. Field of the Invention

The present invention relates to a method and apparatus for use in locating a vehicle driver, passenger or object in the vehicle for controlling vehicle systems including the positioning of vehicle sideview mirrors in relation to the driver's eyes to maximize the view of traffic on either side of the vehicle or the characteristics of vehicle airbag deployment.

2. Description of the Background Art

Passenger and commercial vehicles, e.g. automobiles and fight trucks, are typically provided with a number of comfort features for the benefit of occupants and safety features and systems that are intended to help avoid collisions or to ameliorate the effects of collisions. At this time, virtually all enclosed vehicles, i.e. automobiles, sport utility vehicles, vans, trucks, etc., are provided with safety belts for use by occupants to strap themselves in. In addition, at least front seat driver's side and passenger's side explosively inflated airbags have become standard equipment in such vehicles. Typically, airbags are mounted in the steering wheel hub and in the dash area forward of the front seat passenger and, in some cases, in the vehicle side doors. The airbags are inflated when sudden deceleration of the vehicle is sensed. A force and duration of deployment is currently prescribed that is standardized to average driver and passenger size and seat adjustment position.

Moreover, vehicle mirror assemblies and adjustment systems are provided as standard safety systems in such vehicles. An interior rearview mirror for viewing rearward of the vehicle and exterior left (driver's side) and right (passenger's side) sideview mirrors with which the vehicle driver can view traffic to the sides and rear of the vehicle within certain fields of view dictated by the positioning of the mirrors are provided as standard equipment. Typically, the interior rearview mirror can be manually adjusted about horizontal (pitch) and vertical (azimuth) axes through its mount to the headliner or windshield to provide corresponding pitch and azimuth angle adjustment of the view through the vehicle rear window. Even when properly adjusted, the bordering structure of the rear window limits the view to either side. Consequently, vehicles are provided with left and right exterior rearview or sideview mirrors that are typically mounted at the junctures of the left and right windshield pillars with the adjacent front seat side windows. Mechanical or electromechanical, remote joystick controls are provided to allow the driver to adjust the sideview mirrors for azimuth (side to side about a vertical axis) and pitch (up and down about a horizontal axis perpendicular to the longitudinal axis of the vehicle). Improper adjustment of the sideview mirrors, particularly in azimuth angle results in wide "blind zones" or "blind spots" on either side of the vehicle.

Such blind zones or spots are widely described in the prior art, and examples are depicted as shown, for example, in the FIGS. 1 and 4 of U.S. Pat. No. 5,033,835. The blind zones on either side generally subtend an azimuth arc angle between the limits of the driver's peripheral vision while looking ahead and the left and right limits of the fields of view of the left and right sideview mirrors when the mirrors are aimed along the vehicle sides and a pitch angle generally bisected by the horizon. The blind zones are really cone-shaped tunnel areas expanding outward from the sides of the vehicle slightly downward from the eye level of the driver and away from the vehicle sides. Customarily, these right and left blind zones are referred to as blind spots, and that term will be used hereafter.

The current method of exterior sideview mirror alignment used on virtually all domestic and imported passenger vehicles simply relies on the driver's judgment as to the proper imagery he/she should see reflected by the sideview mirror. This is supposedly gained by experience with different settings. Many drivers erroneously believe that correct azimuth angle alignment is achieved when the side panels of their own vehicle are reflected back to them along one edge of the exterior sideview mirrors when they are in their normal driving position.

A wide number of solutions to the problem of correctly setting the sideview mirror position to maximize the view of the blind spot have been proposed but not adopted. One approach is to attempt to enlarge the viewing angle. Wide viewing angle, static mounted, sideview mirrors and dynamically movable sideview mirrors are the subjects of U.S. Pat. Nos. 4,019,812, 4,187,001, 4,318,590, 4,439,813, 4,575,202, 4,792,220 and 4,971,930. All of these proposed solutions require either bulky assemblies, distort the image in the field of view so that the driver does not see all the potential safety hazards in correct prospective, or are complex electromechanical systems with intermittent or continuously running motors and subsequent noise and vehicle power drain.

Further approaches to solving the problem of correctly aligning the sideview mirrors to eliminate or minimize blind spots are set forth in U.S. Pat. Nos. 5,022,747, 5,033,835, 5,122,910 and 5,237,458. The '747, '835 and '910 patents employ an auxiliary mirror built into a corner of the sideview mirror which images a reference point or marker on the vehicle side to which the mirror is mounted when the main mirror is properly aligned to image the vehicle blind spot. In another form of the '835 patent, the sideview mirror is first adjusted by the driver to image the reference point, and then the electromechanical system changes the alignment a preset amount to image the blind spot. A lamp on the adjustment mechanism lights when the final alignment position is achieved by the system.

The use of auxiliary mirrors on or visible through the front surface of the main sideview mirror that are large enough to view a vehicle reference point reduces the mirror surface area for viewing into the blind spot. Also, the imaged target on the side of the vehicle may not always be clearly visible due to road grime on the vehicle or simply because of low ambient lighting. Finally, salient auxiliary mirrors and targets on the side of the vehicle large enough to be seen by the driver are anathema to automotive stylists.

Moreover, such approaches provide only a limited range of correct mirror adjustment and are not usable in all seat positions for all driver heights. In this regard, it should be noted that the '747 and '910 patents profess that their disclosed systems are insensitive to driver height and seat position of up to 8 inches fore and aft and up and down from a "standard driver". However, the illustrations of FIGS. 8 and 9 confirm that the rearward views attained at these nonstandard positions do widely vary and are not ideal. The ability of the non-standard driver to rely on the setting attained by imaging the vehicle targets depends greatly on how large the sideview mirror surface is. As vehicle manufacturers seek to minimize sideview mirror size for styling and economy reasons, it is clear that this approach may well mislead drivers of non-standard height or seat position preference.

The '458 patent professes to be an improvement on the earlier system of the '747 and '910 patents and discloses a light source 9 in the mirror housing 3 that illuminates a target 7 or is an illuminated target. The target 7 is reflected by an auxiliary mirror 6 and through a light transmissive portion 5 of the sideview mirror 4. It would appear that the targeting approach taken in this system is geared toward ensuring that an exact correct alignment is attained for a "standard driver", and all other driver positions are only approximately correct. Again, the adequacy of the sideview mirror setting for non-standard driver eye locations is highly dependent on the amount of the sideview mirror surface area.

In a further approach, certain automobiles have auxiliary turn signal indicators mounted above the front wheel wells to alert the oncoming driver in the blind spot to the intention of the blinded driver to make a turn or lane change into that lane. It is also proposed to mount the auxiliary turn signal lights to the sideview mirror structure as disclosed, for example, in U.S. Pat. Nos. 4,906,085, 5,014,167 and 5,207,492 Unfortunately these forward mounted, auxiliary turn signal lights may alert an overtaking driver in the adjacent lane too late to be totally effective, and may even encourage drivers to fail to properly set their sideview mirror azimuth angles or to even use their sideview mirrors before initiating a lane change. In the latter case, careless drivers frequently change lanes without using their turn signals or sideview mirrors. Finally, due to their fields of view, if sideview mirrors having such auxiliary turn signals are not properly adjusted in the first place, the auxiliary turn signals may not be seen by an overtaking vehicle in time to react.

Turning to a further aspect of sideview mirror adjustment, frequently, two or more individuals may drive the same vehicle and each adjust the rearview and sideview mirrors to their own liking. To avoid the inconvenience of each driver in having to readjust the rearview and sideview mirrors, it has been proposed that mirror settings be memorized for re-use when a specific driver identification code is entered. The adjustments that are typically made by different drivers are mirror pitch about the horizontal axis depending on the drivers' height or both the mirror pitch and azimuth, if the driver changes the seat height or distance from the steering wheel. In certain vehicles having memorized driver seat positions, the mirror pitch and azimuth adjustment angles are memorized with the seat positions as shown, for example, in U.S. Pat. Nos. 4,267,494, 4,625,329 and 4,727,302. Such systems do not necessarily provide the optimum mirror adjustments for eliminating blind spots, but instead rely on the drivers to make the initial settings that are then memorized.

Many vehicle accidents could be prevented with a simple opto-electronic mirror adjustment aid for left and right sideview mirror alignments to embrace the blind spots peculiar to each vehicle model in the reflected images seen by the driver. To be adapted by vehicle manufacturers, such an aid must be inexpensive, reliable, consume minimal power, and be able to be incorporated with new or existing mirror housings subject to whatever styling considerations are imposed. To be accepted by the driving public, the aid must be simple to operate and must inherently compensate, at least approximately, for variations in driver height and seat position. This inherent compensation should be automatic and occur as the vehicle operator uses the aid's optical cues during mirror alignment. Moreover, when used, the aid should provide positive feedback to the driver that assures him/her that the alignment is correct, even if it appears to the driver to be incorrect. These goals are all met with the embodiments of the present invention described in detail hereafter.

Returning to the use of explosively inflatable airbags, the deployment of the airbags is beneficial or not harmful in the majority of cases. However, injuries to or death of small stature adults, children and infants have been attributed to the airbag deployment force. The force and duration of deployment is standardized to protect an average sized adult located at an average distance from the airbag. If the person is smaller in size and closer than the average distance, the force and duration can be excessive and cause injury or death. In the case of injuries to or deaths of infants, many are caused by failure to use or to properly attach an infant seat to the front passenger's seat belts. Moreover, while the airbag force and duration is standardized to a particular distance, the combination of the seat adjustment and the form or shape of the infant's seat may place the infant in jeopardy. This has led to efforts to educate the driving public to locate infants and children in rear seats which many parents find unacceptable or inconvenient. Despite the clear evidence that airbags and seat belts combine to save many lives, some are urging that they be allowed to optionally disable the airbag deployment system. Rather than such an extreme solution, it would be more desirable to modulate the force and duration of the deployment to take into account the size and location of the driver and front seat passenger or infant's seat.

Many of the considerations to be taken into account and a system block diagram for making the deployment decision and controlling the deployment force and duration or rate of deployment of single stage or multi-stage airbags are set forth in the article entitled "Restraint system electronics", *Automotive Engineering*, August, 1996, pp. 27–31, incorporated herein by reference. In this article, a variety of sensors are described for attempting to determine the position of the driver, passenger(s) and infant seat and other vehicle characteristics, e.g. vehicle speed and the like, that provide signals that are proposed to be combined to control the deployment of airbag(s). Unfortunately, many of these sensors, e.g., seat position sensors, seat belt attachment sensors, weight on the seat measuring sensors are ambivalent or imprecise and can be fooled. Difficulties encountered with attempted use of a variety of sensors to locate a person in a front driver's or passenger's seat are set forth in the article "What's a smart airbag's real IQ", *Automotive News*, Feb. 24, 1997, p. 1.

One further methodology for determining the location of a vehicle occupant employing optical rangefinding techniques is described in the article by W. Chapelle entitled "Sensing Automobile Occupant Position with Optical Triangulation", *SENSORS*, December 1995, p. 18+, incorporated herein by reference. This system requires use of a light projector, imaging lenses and photosensor arrays that are similar to those used in photographic cameras with a projection light source. In such systems, it is difficult for the system to determine just what aspect of the driver, passenger of other object is being imaged. Again, such systems can be fooled by imaging on the wrong feature.

A more accurate and less ambivalent system for determining the presence and the height and distance back of a person or object in a vehicle seat is needed for this application as well as the adjustment of the vehicle sideview mirrors.

SUMMARY OF THE INVENTION

It is therefore a primary object of the present invention to provide a method and apparatus for locating one or more of a driver's eyes, a passenger's eyes, and an infant seat in a vehicle to allow for the automatic adjustment of vehicle systems to their locations in the vehicle.

It is a particular object of the present invention to provide a method and apparatus for locating a driver's eyes in a vehicle to allow for the automatic adjustment of the vehicle sideview mirror(s) to reflect an image of vehicle blind spot(s) not visible in the image reflected by the interior rearview mirror.

It is a further object of the present invention to provide a method and apparatus for locating the position of a driver and/or front seat passenger or infant seat in the respective driver's and passenger's seats in order to allow for the adjustment of vehicle systems, e.g., characteristics of vehicle air bag deployment, in relation thereto.

These and other objects of the invention are realized in methods and systems for deriving the location of a driver's or passenger's eyes or the location of an infant's seat from the adjustment by the driver (or passenger, if capable of doing so) of adjustable light beam(s) emanating from light source(s) or illuminated indicia, until it (or they) intersect the driver's or passenger's eyes or illuminate a target, e.g. a child or an infant's seat, in the front passenger's seat. From the angles of adjustment of the light beam(s) and other known coordinates of the vehicle, the location of the driver's or passenger's eyes or the target may be computationally derived as a set of Cartesian coordinates.

The determined eye location of the driver may be used together with the known pitch and azimuth axes of adjustment of the driver's and passenger's sideview mirror assemblies and known Cartesian coordinates of the vehicle blind spots to derive exterior sideview mirror pitch and azimuth adjustment signal sets. The adjustment signals are applied to feedback servo motors operating in a feedback control loop to correct the driver's side and passenger's side sideview mirror pitch and azimuth settings to properly reflect images of the driver's side and passenger's side vehicle blind spots to the driver's eyes.

The determined eye locations of the driver and passenger or the target location of the infant's seat may be also or alternatively employed in the control of the airbag deployment system and in other vehicle safety and comfort systems. The relative fore-aft distance away from the airbag and the height of the person or target can be computed, and airbag deployment force and/or duration adjusted to compensate for deviation from the standard height and fore-aft distance.

The determination of the location of the driver's and passenger's eyes or the infant seat or other object in the passenger's seat also allows a number of vehicle safety and comfort systems to be advantageously optimized, including climate control, seat level, radio settings, other mirrors, etc.

Assuming a single light source for the moment, the direction of the light beam is adjusted using either an adjustable light mount or an adjustable light beam reflector intersecting a fixed direction light beam from a fixed light source. The angles of adjustment in pitch and azimuth are measured, and the location of the driver's or passenger's eyes or the target is determined using triangulation techniques employing the measured angles and the known Cartesian coordinates of pitch and azimuth axes of adjustment of the adjustable light source or light beam reflector and the known fore-aft seat adjustment plane for the respective driver's or passenger's front seat. This approach assumes that the driver, passenger or infant seat are centered in the driver's or front passenger's seat so that are centered in the fore-aft seat plane.

To provide a somewhat more accurate location of the respective eyes or target, at least two light sources are employed, each emitting a light beam, the direction of which is adjusted using either a pitch and azimuth adjustable light mount or an adjustable light beam reflector intersecting a fixed direction light beam from a fixed light source. When both light beams are adjusted to be seen by the eyes or falling on the target, the angles of adjustment in pitch and azimuth of both light beams are measured. The location of the driver's or passenger's eyes or the target is determined from both sets of measured pitch and azimuth angles and the known Cartesian coordinates of the light beam pitch and azimuth axes, employing triangulation techniques.

In reference to a first preferred embodiment of the invention, at least one fixed light source is located in relation to a vehicle sideview mirror or the interior rearview mirror. The light beam is emitted from the light source in a fixed direction and is reflected by a reflector intersecting the light beam and adjustable with adjustment of the sideview or interior mirror. The combined mirror and reflector is adjustable in pitch and/or azimuth about respective pitch and/or azimuth adjustment axes by the driver until the light beam is visible to the driver's eyes or on a target. Pitch and azimuth angle adjustment measurement means, e.g., miniature angle resolvers or "pickoffs" are associated with the mirror to measure the pitch and/or azimuth angles of adjustment of the reflector. The driver's eye location or a target location are derived from the measured angles of adjustment. Then, the sideview mirror pitch and azimuth adjustment signal sets and/or airbag deployment control signals are derived and employed as summarized above.

In a first variation of the first preferred embodiment, the fixed light source and adjustable reflector are located in relation to the driver's side sideview mirror or both vehicle sideview mirrors. The fixed light source emits a light beam aimed at the vehicle blind spot on that side of the vehicle. The fixed direction light beam intersects a reflector mounted to be adjusted with adjustment of the mirror. Consequently, when the light beam direction is adjusted by adjustment of the particular sideview mirror to a direction where it can be seen, the sideview mirror is adjusted in azimuth and at least partially in pitch. The derived pitch and azimuth mirror adjustment signals are employed to precisely adjust the sideview mirror in pitch and azimuth.

In a second variation of the first preferred embodiment, at least one fixed light source is positioned to emit a light beam against a reflector mounted with respect to the vehicle rearview mirror such that the light beam direction is simultaneously adjusted with manual or mechanized adjustment of the interior rearview mirror to reflect a view through the vehicle rear window into the driver's eyes. In this variation, the light source may be an illuminated indicia or provide a light beam that becomes visible when the driver has correctly aligned the interior rearview mirror to the optimum viewing direction directly rearward of the vehicle, e.g., through the vehicle rear window. The light beam and the rearview mirror pitch and azimuth adjustment axes coincide. The pitch and azimuth adjustment pickoffs are therefore mounted to measure the rearview mirror pitch and azimuth adjustments and provide the pitch and azimuth measurement signals to the microcomputer.

In the second preferred embodiment of the invention for deriving the location of the driver's eyes and for optionally deriving the location of a passenger or infant seat in the front passenger's seat, the direction or one or two light beams is itself directly adjustable. The light source(s) is mounted with respect to the vehicle at known Cartesian coordinates that are outside the fore-aft seat adjustment planes, so that the light beam is adjustable in pitch and azimuth about horizontal (pitch) and vertical (azimuth) adjustment axes. Pitch and azimuth adjustment pickoffs are mounted to measure the pitch and azimuth adjustments of the light beam(s) in relation to reference pitch and azimuth angles and provide the pitch and azimuth measurement signals to the microcomputer.

In a first variation of the second preferred embodiment, at least one light source is positioned within the driver's side and/or passenger's side sideview mirror such that the direction(s) of the light beam(s) can be adjusted by the driver until it (or they) is seen through the vehicle window(s). The adjustment is effected by use of light beam pitch and azimuth adjustment servo motors that are driven by the driver to adjust the light beam in pitch and azimuth until it is seen. The sideview mirror itself is not adjusted in this process.

In other variations of the second embodiment of the invention, at least a pair of light sources are mounted with respect to the vehicle, preferably inside the vehicle cabin, such that at least one is outside the driver's and passenger's fore-aft seat adjustment planes. In one illustrated variation, the driver or passenger adjusts both light beam directions in pitch and azimuth, until the light sources are visible to the driver's eyes or the passenger's eyes or fall upon the target. Light beam pitch and azimuth adjustment pickoffs provide sets of light beam pitch and azimuth angle measurement signals to a microcomputer.

In use of this embodiment by the driver, he/she directly adjusts each light beam direction in pitch and azimuth about the light beam vertical and horizontal adjustment axes, respectively, until the light source is visible to the driver's eyes. The light beam pitch and azimuth adjustment pickoffs directly measure and provide light beam pitch and azimuth adjustment signals to a microcomputer. The microcomputer is programmed to solve sets of optical beam direction equations and/or to use pre-stored look-up table data referenced to the specific vehicle fore-aft seat adjustment plane (s), the Cartesian coordinates of the light beam pitch and azimuth adjustment axes of each light beam, and reference pitch and azimuth directions of each light beam to determine the location of the driver's eyes in the driver's fore-aft seat adjustment plane. In a similar fashion, the passenger can adjust each light beam until it is visible, and the passenger's eye location in the passenger's fore-aft seat plane can be determined. Moreover, the driver can aim each light beam to strike the target in the passenger's seat and initiate the determination of the location of the infant's seat or child in the front passenger's seat. In each case, the Cartesian coordinates of the derived location are used as summarized above to develop mirror adjustment signals to adjust the sideview mirrors or to control the force and duration of airbag deployment.

The eye or target location aids of the present invention may advantageously be employed with both vehicle sideview mirrors and coordinated with the setting of the interior rearview mirror in a variety of combinations and permutations. The additional components of the mirror assembly (if any, in the particular combination) are relatively inexpensive and durable. In the disclosed embodiments and variations where the light source(s) are located within the vehicle in association with the vehicle rearview mirror or otherwise positioned therein, the existing vehicle sideview mirror assemblies need not be modified, other than adding mirror pitch and azimuth angle pickoffs to control sideview mirror positioning under feedback control by the microcomputer.

The interior locations of the light sources avoids any problems of passing the light beam through the vehicle door windows in bad weather or due to grime.

The eye or target location and sideview mirror alignment aids may be implemented employing the existing vehicle microcomputer or a separate inexpensive on-board microcomputer.

Through use of the alignment aids of the present invention, accuracy in positioning of the sideview mirrors to reflect objects in the vehicle blind spot and driver appreciation of the proper mirror settings are greatly increased, hopefully resulting in lower frequency of accidents and injury. In each case where sideview mirror positioning signals are derived outside of direct control by the driver, the driver may be provided with the ability to manually override the sideview mirror pitch and azimuth settings for safety reasons.

The risk of injury due to airbag deployment force may be diminished through correlation of the airbag deployment force and duration to the size and location of a driver or passenger in the driver's or passenger's seat as determined in accordance with the teachings of the present invention.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 9:
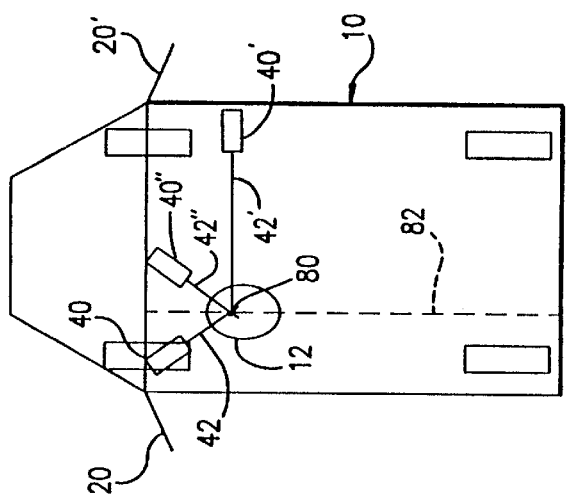
FIG. 9 schematically illustrates other locations of the light source and associated components of the second embodiment of the invention inside the vehicle.

Introduction—In the following, a method and apparatus is disclosed for locating the driver's eye location and optionally, the front seat passenger's eye or infant seat location, involving adjustment of the direction of a light beam from a single light source or the directions of two or more light beams from two or more spatially separated light sources emitting a light beam. Several variations are presented as to the nature, location(s) and adjustment mechanism(s) for adjusting the light source(s) so that light beam(s) are visible to the driver's (or passenger's) eyes or directed upon an infant seat target. It is one principal purpose of the invention to employ the derived locations in controlling vehicle safety and comfort systems, e.g., controlling the deployment of vehicle airbags in the event that a collision occurs. It is a further principal purpose of the present invention to derive exterior vehicle sideview mirror adjustment signals from the location of the driver's eyes, so that the sideview mirrors reflect images of the vehicle blind spots to the driver's eyes. The derivation of the driver's eye location in the context of and the employment of same in the adjustment of vehicle sideview mirrors will first be described.

The blind spot or blind zone for a specific vehicle having specific sideview and interior rearview mirror styles is fixed and can be determined a 'priori by the mirror manufacturer. This is an approximate assumption, as the actual blind spot location will be somewhat affected by the relative displacement in three dimensional space between a particular driver's eyes (to be more precise, the center point between the driver's left eye and right eye) and a suitable mirror reference point at which the driver is looking.

As is well known, a driver intuitively looks at the center of the mirror when aligning a mirror. Furthermore, the intersection of the mirror's pitch and azimuth rotation axes constitutes a true pivot point, which remains stationary with respect to the housing regardless of mirror adjustment. For most mirrors, the location of this pivot point can be considered to be at or very near the center of the sideview mirror's reflective surface. Hereafter, the location of the mirror reference point will be considered coincident with the center of the mirror and the mirror pivot point.

The nominal location (referenced to the center of the mirror) of the blind spot is a function of the width (end to end) and height (top to bottom) of the sideview mirror, the known vehicle dimensions, the location where the sideview mirror housing is mounted to the vehicle, the angular field of view that the interior rear view mirror covers (perhaps, more properly, does not cover), and the ranges of possible seat heights, seat back angle adjustments, fore-aft seat positions, and driver population heights. With consideration of these variables, appropriate mathematical formulae or algorithms may be used by the mirror manufacturer to determine, a 'priori, a best estimate for a direction vector (unit vector) pointing from the mirror reference point to the nominal center of the blind spot. These mathematical formulae or algorithms are based on the simple laws of ray optics as applied to reflection from a mirror surface and are well known to those practicing in the art of automotive mirror design.

In both preferred embodiments of the present invention relating to the adjustment of the vehicle sideview mirrors and in all their variations the exact blind spot direction vector (unit vector), rather than a nominal or approximate direction vector, pointing from the mirror reference point to the center of the blind spot, can be determined. While the change in the blind spot direction vector normally represents only a small "second order" departure from the nominal direction this correction is possible to implement whenever the exact location of the driver's eyes is calculated by a microcomputer. In this case, since the center of each sideview mirror is fixed in the same vehicle body frame of reference the exact blind spot direction vector can be computed in real-time or simply looked up from a stored table of pre-computed results. The exactly correct, or more precisely, optimal, mirror orientations in pitch and azimuth for the particular driver's eye location in the vehicle can then be determined, and the mirror automatically driven to those angular positions.

In all the preferred versions of the first and second embodiments of the present invention and in all the variations thereof, the driver's eye location (more precisely a center point located between the driver's eyes) is explicitly calculated. Hence, "second order" adjustments of the blind spot direction for differences in driver's stature and seating position are included. The determination of the correct mirror pitch and azimuth positions involves calculations by an on-board or vehicle microcomputer using mathematical formulae and/or algorithms based on data stored in the form of look-up tables. These calculations must be performed during the actual mirror adjustment process as conducted by the vehicle driver rather than simply being used to determine the best estimate for the blind spot direction vector a 'priori by the mirror manufacturer. These formulae or algorithms are again based on the laws of ray optics applied to mirror reflection and are well known to those practicing in the art of automotive mirror design.

First Preferred Embodiments:

A summarized above, the first embodiment involves use of one or more fixed light sources emitting a respective light beam that is deflected by a reflector until the light beam is visible to the driver whereupon the driver's eye location may be derived. In a first variation illustrated in reference to FIGS. 1–5, each light source and reflector are associated with a vehicle sideview mirror. In a further variation illustrated in reference to FIGS. 11–15, a single light source and reflector are associated with a vehicle rearview mirror.

In the first variation of the first preferred embodiment illustrated in FIGS. 1–5, the a 'priori mathematical determination of the nominal blind spot direction with respect to the aforementioned mirror reference point on the mirror surface is used to mount a narrow wavelength light source emitting a light beam in a fixed relationship with respect to the vehicle left and/or right sideview mirror housing. When properly mounted in the mirror housing, the Cartesian coordinates of the light source references the vehicle longitudinal (fore-aft) axis, the vehicle's vertical axis perpendicular to the road surface, and a transverse horizontal vehicle axis, so that the light beam is launched at the nominal blind spot in the azimuth direction.

Both the fixed pitch and azimuth light beam launch directions are set during fabrication of the mirror assembly with respect to the known characteristics of the vehicle and driver population taken into account as described above. For most vehicle applications, the pitch launch direction will be close to horizontal as only small pitch angles, say within ±10 degrees of horizontal, are typically involved in mirror alignment. Furthermore, because near optimal pitch alignment of the driver's side mirror is relatively easy to achieve for most drivers, even manually, the following discussion shall be directed initially to show how the first preferred embodiment improves azimuth alignment of the driver's sideview mirror.

The mirror reference point, the light source center, and the light beam pitch and azimuth launch directions are all fixed with respect to the vehicle frame. An auxiliary mirror attached to the main mirror causes the light beam to be deviated into the driver's eyes as he/she manually adjusts the driver's sideview mirror. When the beam intensity is maximized in the driver's eyes, appropriate mirror adjustment pitch and azimuth angle measurement pickoffs read the pitch and azimuth orientation of the mirror with respect to the vehicle frame and then input these azimuth and pitch measurements to a microcomputer. This information may then be employed to locate the location of the driver's eyes.

Knowing the Cartesian coordinates location of the driver's eyes allows for a "second order" correction of the driver's side mirror orientation automatically by the microcomputer to accommodate drivers of different stature or having preferred seating positions from a "nominal" or hypothetical driver. Further, knowledge of the driver's eye location can be used, in more complex variations of the first embodiment, to partially or totally automate the settings of the second (passenger's) sideview mirror. In addition, knowledge of the driver's eye location may be useful for other purposes, such as airbag deployment control.

Figure 2:
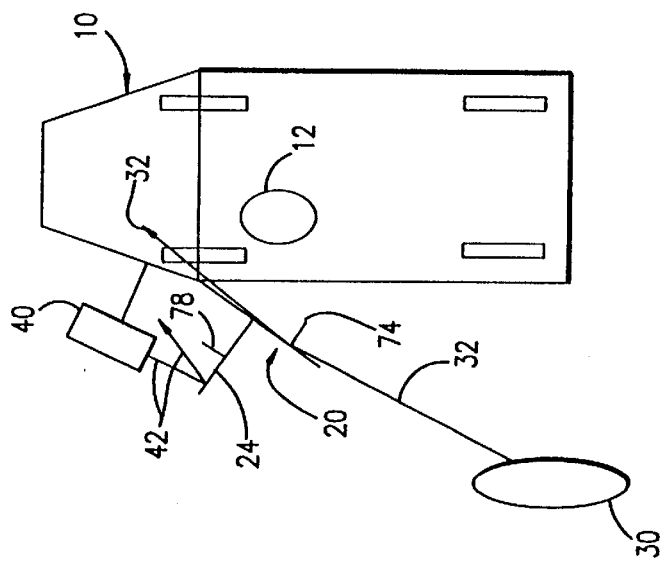
FIG. 2 is a two-dimensional plan view showing the sideview mirror incorrectly aligned so that the driver cannot see objects in the vehicle's blind spot.
Figure 1:
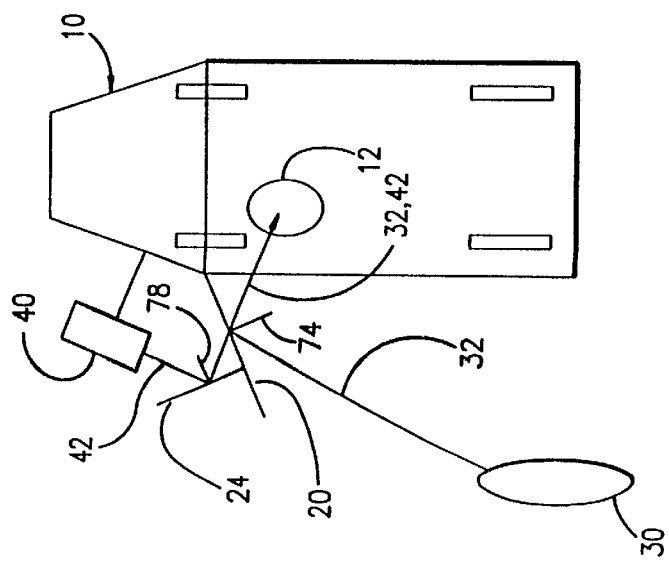
FIG. 1 is a top plan schematic view showing the basic geometry involved in the angular, horizontal azimuth adjustments of a sideview vehicle mirror achieving a correct alignment that reacts light from objects in the vehicle blind spot.
Figure 3:
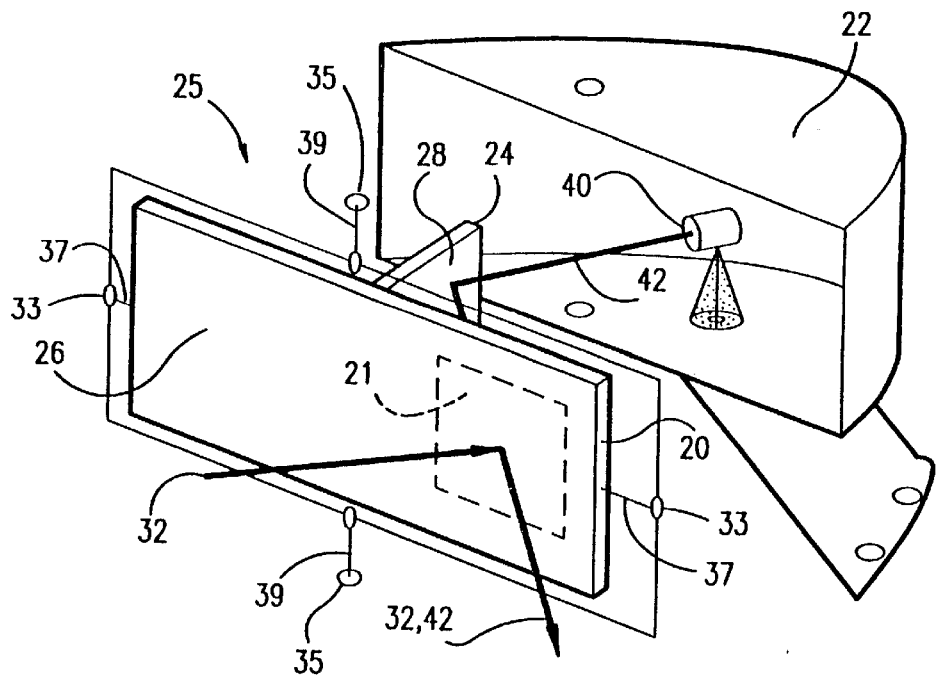
FIG. 3 is a simplified perspective illustration of a sideview mirror assembly used in one variation of the first preferred embodiment of the invention wherein the light source located therein is fixed in position.
Figure 4:
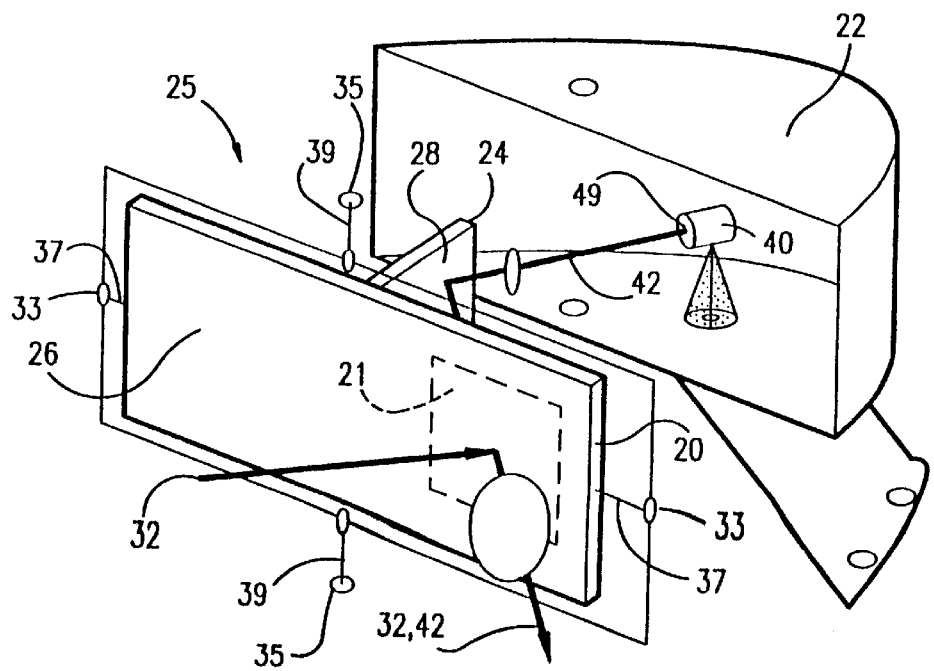
FIG. 4 is a simplified perspective illustration of the sideview mirror assembly of FIG. 3 modified to depict one simple means of spreading the reflected light beam to compensate for varying driver heights.
Figure 5:
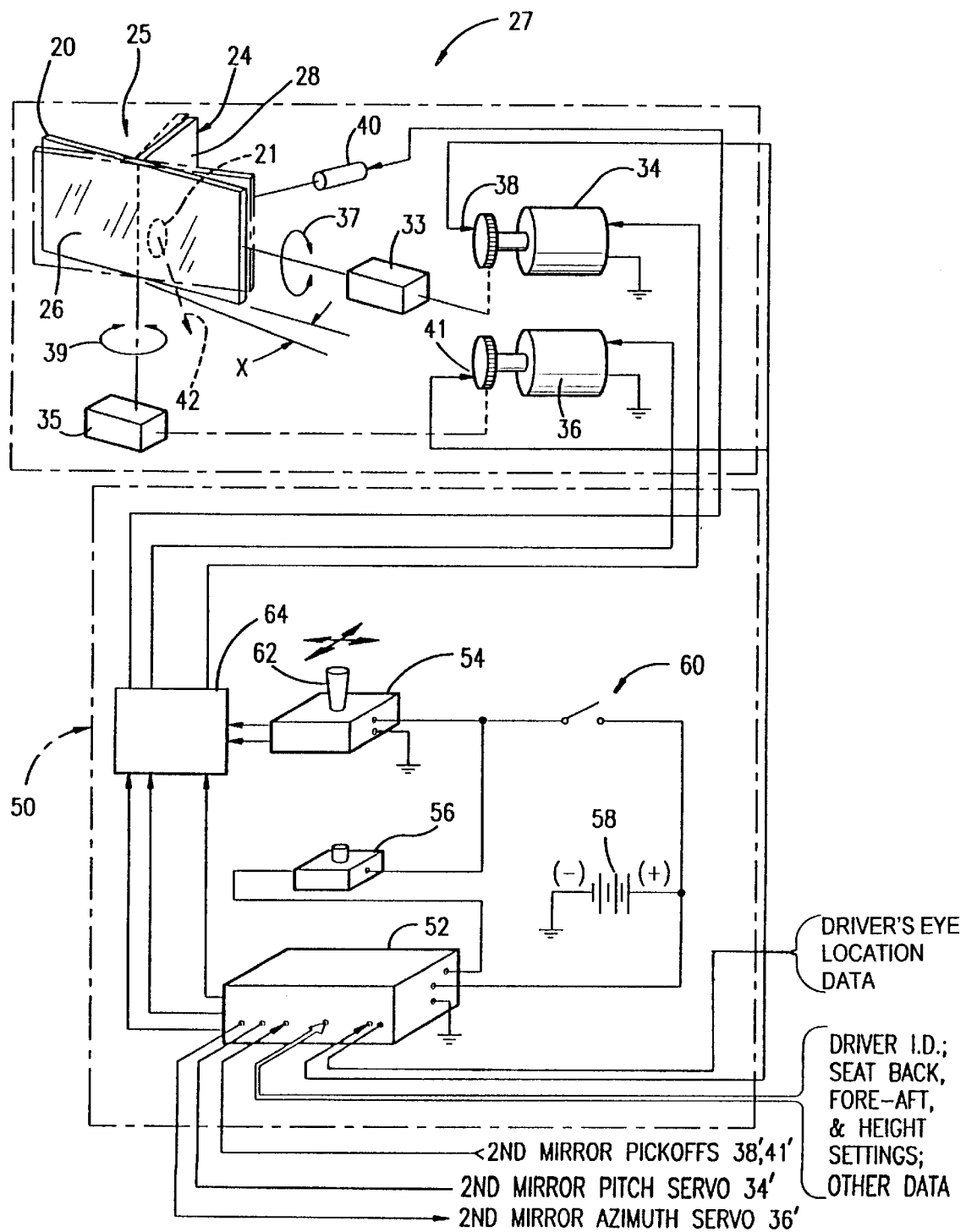
FIG. 5 is a simplified system block diagram illustrating a microcomputer-based system for locating the driver's eye location for use in vehicle control systems and for effecting the adjustment of the vehicle sideview mirror assemblies in accordance with the first preferred embodiment of the invention.

In the context of this variation of the first embodiment, FIGS. 1 and 2 are schematic illustrations of the concept and theory of the proper and improper azimuth adjustment of the driver's side sideview mirror. FIGS. 3 and 4 illustrate in simplified views the mechanical configuration of the improved mirror assembly of the first embodiment for providing the correct azimuth alignment and allowing a range of pitch adjustment to compensate for driver eye level height variation. FIG. 5 schematically illustrates a microcomputer-based system for locating the driver's eye location for use in vehicle control systems and for effecting the adjustment of the vehicle sideview mirror assemblies in accordance with one variation of the first preferred embodiment of the invention.

Turning to FIG. 1, it shows a schematic, top plan view of the basic geometry involved in the first embodiment of the invention with respect to a vehicle 10 with a driver 12 sitting inside and a sideview mirror 20 in correct alignment to reflect the image of the blind spot 30 into the driver's eyes. A light beam emitter 40 is fixed to the mirror housing 22. Use of a small, low power Light Emitting Diode (LED) for the mirror housing light beam emitter 40 is preferred due to the ease of aiming, mounting and powering it inside the mirror housing 22 and behind the mirror's back surface. For example a Panasonic Corp. LN28RAL (US) high brightness LED may be used to emit a bright red light beam 42 that appears as a spot on the main mirror surface 26 reference point in the selectively light transmissive region 21 when the reflected light beam 42 strikes the driver's eyes.

Alternatively, the light source 40 could be a small lamp, or a visible low intensity laser diode (with the beam 42 suitably spread rather than collimated). In this regard, while a narrow bandwidth is preferable, wide band (white) light could even be employed, as long as it could be seen in daylight by the driver 12. In addition, the light source 40 could be remote from the sideview mirror housing 22, with the light "piped" to the mirror housing 22 mounting position via a fiber optic cable. In the latter case, the end of the fiberoptic cable, suitably cleaved and lensed, would constitute a virtual light source within the mirror housing 22 cavity. In any case, the spot of light seen at the mirror surface 26 in selectively light transmissive region 21 should be bright enough to be seen in daylight and distinctive of the reflected image while not so bright as to damage the driver's eyes.

The optical rays 32 to the driver's eyes from the blind spot 30 and the LED light beam 42 emitted by LED 40 during the adjustment for a properly aligned sideview mirror 20 are depicted. Any variations in driver height and required small adjustments in vertical alignment (i.e. in mirror pitch) are not accounted for in FIG. 1 for simplicity of explanation.

As also shown in FIG. 3, the main sideview mirror 20 is attached to a much smaller, stubby "auxiliary" mirror 24 projecting at 90° from its back side to form a mirror subassembly 25. The sideview mirror 20 has a primary reflective front surface 26 facing outward of the mirror housing 22 (depicted with an outward extending mirror normal vector 74) and a second interior or back surface and may be of any conventional configuration and construction. The auxiliary mirror 24 (depicted with an outward extending normal unit vector 78, perpendicular to the mirror surface) is mounted to the back surface at right angles to the plane of reflective surface 26 near the center of the sideview mirror 20 and extends into the mirror housing 22. The auxiliary mirror 24 has a reflective mirror surface 28 at 90° to the main mirror surface 26. The auxiliary mirror 24 changes the azimuth direction of the light beam 42 by 90° when and only when the main mirror surface 26 is oriented properly in azimuth so as to reflect rays from objects in the blind spot into the driver's eyes. When the sideview mirror 20 is properly aligned in azimuth, both rays 32 from the blind spot and the beam of light 42 are directed to the driver's eyes.

For the reflected light beam 42 to be transmitted through the sideview mirror 20 and seen by the driver 12, a small, central region 21 of the mirror surface 26 is not totally reflective but is transparent, or at least semi-transparent, or otherwise selectively transmissive to the wavelength of the light beam 42 employed. The selectively transmissive region 21 may be readily achieved in a number of ways.

One method is by fabricating the mirror surface 26 using properly selected layers of thin dielectric films which reflect all wavelengths except the selected wavelength of the light source 40. The only region 21 where the dielectric layer stack would actually have to permit the narrow band light beam to pass is shown in an exaggerated size in dashed lines in FIGS. 3 and 4. Therefore, the sideview mirror 20 would only have to be selectively transmissive to the wavelength of the light beam in the selectively transmissive region 21. The art of makingsuch wavelength selective reflectors is well known to thin film coating specialists engaged in multi-layer dielectric mirror fabrication as shown, for example, in the above-referenced '167 and '085 patents.

An alternate, perhaps simpler, method for achieving transmission of the light beam 42 through the selectively transmissive region 21 can be employed by varying the silver metal deposition process. In this method, the small region 21 (typically a few mm on a side) would be left not silvered or only partially silvered. Such techniques are well known to those skilled in the art of metal film mirror fabrication. In this case, the not-silvered, or partially silvered, light transmissive region 21 is transmissive of all light wavelengths or "white" light. However, in practice, only the light emitted by the light source 40 would be present, when energized, within the mirror housing 22 and visible to the driver through the region 21 when the sideview mirror 20 is properly aligned. At other times, the selectively transmissive region 21 would appear as a small black dot on the otherwise reflective mirror surface 26. For this reason, using this or similar methods of fabrication of a region that would pass a wider band or all wavelengths of visible light still results in a selectively transmissive region 21, for all practical purposes. The expression "selectively light transmissive region" is therefore intended to include any such fabrication technique and resulting structure and technical equivalents thereto. Similarly, the expression "selective wavelength" is intended to include narrow bandwidths and full "white" light depending on the construction.

With approximately correct alignment of the exterior sideview mirror 22 by the vehicle driver 12, central rays 32 from the blind spot image area 30 reflected from mirror surface 26 and the reflected alignment light beam 42 transmitted through the selectively transmissive region 21 are collinear when directed to the driver's eyes, as shown in FIG. 1. The driver 12 will see both the bright spot of the narrow bandwidth light beam 42 as well as the reflected blind spot image area 30. This collinear condition is not exact when driver height and fore-aft seat position is considered, but is still approximately correct, as will be discussed shortly. In the first embodiment of the current invention, this small error in proper mirror alignment is subsequently automatically eliminated after the exact location of the driver's eyes is determined by the microcomputer 52 of FIG. 5.

On the other hand, when the sideview mirror 20 is substantially misaligned, the vehicle driver 12 no longer sees the alignment light beam 42, or at least the radiation intensity entering the driver's eyes is much reduced from that occurring under correct mirror alignment. FIG. 2 is again a two-dimensional plan view as in FIG. 1, but showing the effect of incorrect alignment of the driver's side or left sideview mirror 20. Due to the incorrect alignment, the driver 12 would not be viewing traffic in the vehicle's blind spot if he/she looked into the mirror 20. The LED light beam 42 is reflected away and would not be seen by the driver 12 in this incorrect mirror position.

FIG. 3 shows a simplified mechanical assembly drawing of this first preferred embodiment of the opto-electronic aid for alignment of automotive exterior sideview mirrors. As noted, the LED 40 is fixed to the stationary mirror housing 22, and the light beam 42 points into the "nominal" blind spot area 30 (as stated earlier really a conical shaped volume). The reflection of the light beam 42 afforded by the small auxiliary mirror 24 through the selectively light transmissive region 21 (shown dotted) of the sideview mirror 20 is depicted. The sideview mirror 20 is supported for rotation about the horizontal or pitch and vertical or azimuth mirror axes 37 and 39.

The actual size of the auxiliary mirror 24 can be quite small, on the order of 0.5" wide by 0.5" high by 0.1" thick. It should also be noted that the auxiliary mirror 24 used in the first preferred embodiment does not have to be a physical mirror. Instead, mirror 24 could be a 90° corner cube reflector, suitably mounted on the back side of sideview mirror 20. Alternately, mirror 24 could be a mechanically ruled or holographically formed diffraction grating placed on the back surface of the sideview mirror 20, where the appropriate diffraction order would redirect the light beam 42 by 90° and then through the selectively light transmissive region 21.

In regard to all of the described embodiments, it should be noted that, depending on the mirror design and mirror mounting system used, the pitch and azimuth mirror axes 37 and 39 may not be truly horizontal and vertical, respectively, as measured against the force of gravity, nor even be exactly orthogonal to one another. Rather, horizontal and vertical as used herein must be considered as nominal directions. However, whatever their exact orientation with respect to each other and gravity, the axes 37 and 39 are constants in any given mirror subassembly 25 and vehicle.

For illustration clarity, the sizes of the mirror alignment aid components are exaggerated in FIGS. 1–3. The reflection of light beam 42 is actually much closer to the "root" (the junction line between the two mirrors 20 and 24). Furthermore, the root and the selectively light transmissive region 21 are displaced in FIGS. 1–3 for ease of illustration. In practice, they are virtually coincident with the previously described mirror reference point on the front surface of the mirror at or very near the center of the mirror 20 and at or near the intersection of the pitch and azimuth mirror axes 37 and 39. Therefore, in reference to FIG. 3, under a condition of proper alignment, the light beam 42 reflects from the reflective mirror surface 28 near its "root" with the sideview mirror 20 and is transmitted through the selectively light transmissive region 21 of the sideview mirror 20 and through the vehicle 10 window into the vehicle interior. When the driver sees the transmitted light beam 42, the mirror reflective surface 26 is properly aligned to reflect the rays 32 of the vehicle blind spot 30 on that side of the vehicle.

It should be noted that the LED light beam 42 is, in practice, not the collimated pencil beam shown for simplicity in FIG. 3 but rather diverges into a radiation cone. Thus, reasonably small, random motions of the driver's head may occur, while the main LED beam 42 will still be maximized in the driver's eyes when the mirror 20 is properly aligned.

Examining FIGS. 1–3 further, it should be noted that the LED 40 points at the "nominal" blind spot 30 in azimuth. On the other hand, the LED 40 should not actually point at the "nominal" blind spot 30 in pitch, at least if the auxiliary mirror 24 is only a single surfaced mirror as shown. Rather the LED 40, or other light source, beam 42 should be angled upwards in pitch to the same amount (in degrees) that a nominal driver would want his or her view of the blind spot in the center of the mirror to be angled downwards.

To understand this, consider the following. The driver's eyes are usually higher than the horizontal pitch axis 37. The blind spot 30 is usually slightly below the level of the mirror subassembly 25, i.e. closer to the surface of the road. This is also usually below the driver's eye level. Thus, in order for the LED light beam 42 to be approximately collinear with the central ray 32 from the blind spot 30, as seen by the driver 12, the LED light beam 42 must actually be angled a small amount upwards corresponding to the nominal small upward angle of the direction vector (unit vector) 66 pointing from the mirror reference point to the location point of a typical driver's eyes 80. Once identified mathematically or empirically, this nominal upwards pitch adjustment of LED 40 can be fixed for a given mirror style and vehicle model.

When angled slightly upward, the LED light beam 42 will continue to rise into the driver's eyes upon reflection from the auxiliary mirror 24 through the selectively transmissive region 21. This path is similar to the path in which the light ray 32 from the image in the blind spot 30 are deviated upwards into the driver's eyes by the action of the main mirror reflective surface 26. In the event that the mirror is high mounted on the particular vehicle so that a typical driver's eyes are nominally below the mirror center, the LED beam 42 would, of course, have to be angled down rather than angled up.

From the geometry depicted in FIGS. 1–3, it should also be noted that this first preferred embodiment is fairly insensitive to driver fore-aft seat placement although not totally insensitive. In particular, the fixed LED 40 always launches its light beam 42 toward a nominal blind spot. Regardless of where the driver is sitting, objects in this nominal blind spot will be reflected into the driver's eyes after the mirror is aligned using the LED 40. As noted, the actual blind spot location and hence the optimal azimuth orientation of the mirror will depend somewhat on the driver's stature and fore-aft seating position. Normally, this shift in actual blind spot location with driver fore-aft seat position is very small, and in some versions of the first embodiment described in the parent patent application this shift was ignored. There, the driver's eyes were always directed at the nominal blind spot. In the first embodiment of the current invention, any shift in blind spot with driver stature and fore-aft seating position is totally compensated for.

Turning now to adjustments in pitch made for driver height or selected seat height position, this usually requires a slight rotation of the sideview mirror 20 about its nominally horizontal pitch axis 37 from a condition of being exactly vertical. In the first preferred embodiment, the central rays 42 and 32 of the LED 40 and blind spot 30 will therefore not quite be collinear when they enter the driver's eyes at the extremes in height/seat position, at least when only a single auxiliary mirror 24 is employed.

A more complicated "doublet" auxiliary mirror, of the type described below with reference to FIGS. 11–15, possessing two orthogonal reflecting surfaces, could eliminate the problem of non-co-linearity in pitch between the blind spot imagery and the alignment beam. In particular, a doublet auxiliary mirror will be shown as part of an interior rearview mirror assembly used in one variation of the second preferred embodiment later in this patent continuation application. However, fabricating and installing a doublet mirror in an exterior sideview mirror where only very minimal pitch adjustments from vertical are required in the first place may not be cost effective and only unduly complicates the present discussion. What remains to consider, then, is how different driver height/seat height positions, and hence eye levels, may be accommodated in this first preferred embodiment with minimum reduction in azimuth alignment accuracy, even though only a single surfaced auxiliary mirror is employed.

As noted above, depending on the amount of driver eye level variation from the design norm for the particular vehicle, the sideview mirror 20 will have to be tilted plus or minus a few degrees from its nominal pitch orientation. The following modification to the first embodiment will work well with mirror designs in which the nominal pitch angle is near 0° or true vertical.

FIG. 4 shows this modification involving simply diverging the LED light beam 42 to encompass the variety of driver eye levels typically encountered. It is only necessary to insure that the LED light beam 42 spreads adequately in the vertical direction so that both tall and short drivers, even in the extreme seat positions, will see the beam approximately maximized when the mirror 20 is properly aligned in the azimuth direction.

Non-uniform divergence of the reflected light beam 42 is frequently already associated with many LEDs 40. In this case, it may only be necessary to align the LED 40 on its mount so that the greater inherent light beam divergence is along the vertical direction. If still more vertical divergence is necessary, a simple anamorphic or flat Fresnel or miniature glass rod lens (so-called SELFOC lens) 61 can be placed on the end of the LED 40 to produce the desired somewhat elliptical beam spot pattern. Typically, a 5°–10° divergence cone would be appropriate. FIG. 4 shows such a lens 61 mounted on the LED 40 to properly shape the reflected light beam 42 into the depicted elliptic pattern as seen within the driver's compartment.

In this first embodiment of the present invention, the LED light beam 42 launch angle is not changed as the driver 12 tilts the sideview mirror 20 to compensate for variations in driver height. Hence, the degree of co-linearity of the LED beam 42 and true blind spot image rays 32 is again reduced just as with driver fore-aft seat adjustment. Since only a small range of mirror 22 pitch tilt should encompass all driver heights, this slight reduction in exact co-linearity of the LED and blind spot central rays should be quite tolerable when additional spreading of the LED beam 42 in the vertical direction is introduced as described with respect to FIG. 4. The vertical spread of the light beam 42 makes it easier for the driver 12 to see the light beam as the mirror azimuth change is being made. Then, the driver 12 can readily maximize the intensity of the LED beam 42 in his or her eyes by operating the mirror pitch control and can be assured that any residual azimuth misalignment from driver eye height effects will be very small.

It should also be noted in this regard that most drivers are able to easily visually determine the pitch adjustment that provides a near optimum view rearward from the reflected blind spot image 30. Pitch alignment is correct when the driver sees neither the sky nor the road surface immediately behind the vehicle but rather is able to view the horizon behind the vehicle, approximately centered in his/her field of vision in the sideview mirror.

All of the FIGS. 1–4 are schematic and exaggerated in certain details to illustrate and ease the understanding of the principles of blind spots and certain aspects of the invention.

The particular joystick control, suspension of the mirror subassembly 25 within the mirror housing 22 that allows adjustments in pitch and azimuth, and the mechanism employed to make the adjustments are not shown in FIGS. 1–4. This is for ease of illustrating the principle components and operation of the first embodiment. It should be understood that a ball swivel joint, pitch and azimuth gimbals or any of the known, remote control electromechanical mirror adjustment systems, including those shown in any of the above-referenced patents, could be employed to provide a suitable suspension of the mirror subassembly 25 and adjustment mechanism for providing adjustment of the mirror pitch and azimuth.

Turning to FIG. 5, it depicts a system for the determination of the driver's eye location employing one or two light sources which are enabled to emit light beams that are reflected by a reflector to intersect the driver's eyes in order to derive the driver's eye location, particularly to develop sideview mirror pitch and azimuth adjustment signals. The system of FIG. 5 may also be employed to derive the driver's eye location for purposes of determining the height and fore-aft distance of the driver from the driver's side air bag, and to use that information to adjust the airbag deployment force and duration as described below with reference to FIG. 16. In addition, FIG. 5 depicts the components of the system used for these purposes that may be employed with the variation of the first embodiment described below with reference to FIGS. 11–15. FIG. 5 also depicts the common components of such systems of the first embodiment required for both a purely opto-mechanical alignment aid and for the more complex, automated sideview mirror adjustment system described in the first preferred embodiment of the present invention.

In the comprehensive system of FIG. 5, the mirror assembly 27 is depicted in relation to the alignment aid control assembly 50 including a joystick control 54 and optionally including a vehicle or on-board integrated microcomputer 52 and input/output signal lines. The mirror assembly 27 includes the mirror subassembly 25 supported on mirror pitch and azimuth gimbals 33 and 35. The mirror adjustment in relation to the LED 40, fixed in position in the mirror housing 22, is effected by mirror pitch and azimuth servo motors 34 and 36. The mirror pitch and azimuth gimbals 33 and 35 allow the rotation of the mirror subassembly 25 about the nominally horizontal and vertical mirror axes 37 and 39, respectively, in response to pitch and azimuth servo motor drive signals.

The mirror assembly 27 of the system depicted in FIG. 5 may be duplicated for both the right and left exterior sideview mirrors. Separate joystick controls 54 or a sequential operation of the joystick control 54 may be provided to control the pitch and azimuth alignment of each mirror subassembly 25 in the manner described below. The comprehensive alignment aid control assembly 50 depicted in FIG. 5 preferably comprises the joystick control 54 and a button 56 powered by the vehicle battery 58 when ignition auxiliary power switch 60 is closed, the switching network 64, button 56 and microcomputer 52.

The mirror adjustment joystick control 54 in this variation of the first embodiment serves to provide illumination power to the LED 40 and directly adjusts the mirror 20 in tilt or pitch and azimuth, the latter similar to operation of an ordinary exterior power sideview mirror. In the depicted comprehensive embodiment of FIG. 5, the joystick control 54 provides an LED power signal to the LED 40 and servo motor drive signals to the servo motors 34 and 36 directly (bypassing depicted switching network 64) during an adjustment. As described above, the initial manual mirror adjustment may alternatively be accomplished via a cable extending from the joystick control 54 to a mechanical linkage for adjusting a known ball joint mirror pitch and azimuth support mechanism mounted in the mirror housing 22.

In this variation of the first embodiment of the present invention the vehicle or onboard microcomputer 52 is interfaced through the button 56 and switching network 64 as shown in FIG. 5 to provide simple on-off control and memory functions and to compute the driver's eye location, update the blind spot direction to be consistent with the computed driver's eye location, and direct the sideview mirror through servo control to reflect the desired imagery into the driver's eye regardless of driver stature and seat position. In this regard, the mirror pitch and azimuth gimbals 33 and 35 or servo motors 34 and 36 also include angular measurement means or pickoffs 38 and 41, respectively, for providing mirror pitch and azimuth angular position data to the microcomputer 52. The pickoffs 38, 41 are miniaturized angle resolvers, and may be rotary optical encoders, preferably using absolute encoder disks of the type disclosed, for example, in the article "Principles of Rotary Optical Encoders", appearing in SENSORS, April 1993, pp. 10–18.

Particularly in original equipment manufacture applications, the vehicle or on-board microcomputer 52 may be also be used to memorize the pickoff signal values after a driver has once aligned each mirror and then generate the optimal pitch and azimuth mirror alignment signals for the sideview mirror(s) on subsequent occasions in a "memory" mode of operation. The object here is to avoid requiring the driver to repeatedly realign the side view mirror(s) after having already done this once before, even if another person has driven the car since then and has changed the mirror alignment. Apart from the pickoffs 38, 41 and microcomputer 52, all that is required is a suitable identification code, card or key for each driver and an entry system interfacing with the microcomputer 52. The microcomputer 52 may also be operational to receive seat position data and other vehicle data that is personalized to the ID code of the driver as shown in FIG. 5. Finally, the driver's eye location computed by the microcomputer 52 may also be stored and used for airbag deployment control settings and other vehicle system control functions such as radio, heater, seats, etc., assuming that the driver inputs an ID code upon entering the vehicle.

Another variation of the first embodiment (that also requires microcomputer 52 and that may be implemented with or without the memory mode) allows for elimination of the LED 40, selectively light transmissive region 21, and auxiliary mirror 24 in the passenger side mirror. Instead of using the light beam 42, the passenger's side exterior sideview mirror would be aligned based on the results of the driver's side sideview mirror alignment, in particular, on the results of the driver's eye location computation. Alignment of the passenger's side sideview mirror would be completely automatic under computer control using pitch and azimuth servo motors and pitch and azimuth angle measuring pickoffs installed as part of the second mirror assembly long with certain other assumptions. This additional variation of the first embodiment will be discussed after the second embodiment is described and in reference to FIG. 8, since the required computations involve the same equations as are solved in the second embodiment.

The method by which the system of FIG. 5 may be employed to refine the pitch and azimuth position achieved by the driver's initial adjustment of the sideview mirror will now be described. After the driver has manually adjusted the sideview mirror 20 to maximize the intensity of light beam 42 by adjusting the mirror's azimuth angle, and after he/she has adjusted the mirror 20 to an acceptable pitch angle, the first preferred embodiment of the current invention goes into an automatic mode to refine the alignment. In particular the microcomputer 52 of FIG. 5 uses the mirror pitch and azimuth angle determination pickoffs 38 and 41 to measure the pitch and azimuth angles and then determines the driver's eye location. The mathematics involved are the same as for the second preferred embodiment described below and are described below. In turn, this allows a more accurate "second order" assessment of the true blind spot location with respect to the vehicle.

Next, refined pitch and azimuth orientation angles are computed for the sideview mirror 20 so as to produce the proper blind spot imagery for a driver of a given stature and seating position as opposed to one of nominal stature seated in some nominal position behind the steering wheel. Again, the mathematics are the same as for the second preferred embodiment and are described below. The microcomputer 52 then derives pitch and azimuth adjustment signals that are applied to the pitch and azimuth servo motors 36 and 34 to adjust the mirror to these optimal pitch and azimuth angles automatically using the closed loop feedback control system.

Second Preferred Embodiment

Figure 6:
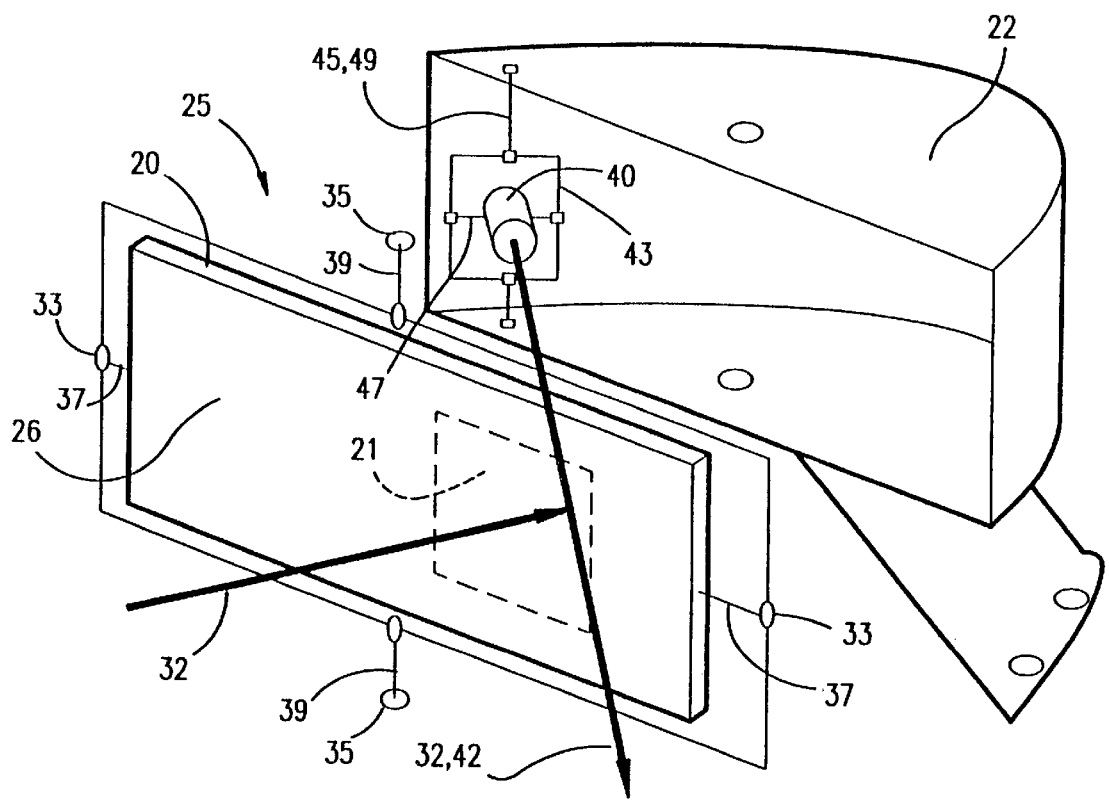
FIG. 6 is a simplified perspective illustration of a sideview mirror assembly used in one variation of the second preferred embodiment of the invention wherein the light source located therein is itself adjustable in pitch and azimuth.
Figure 8:
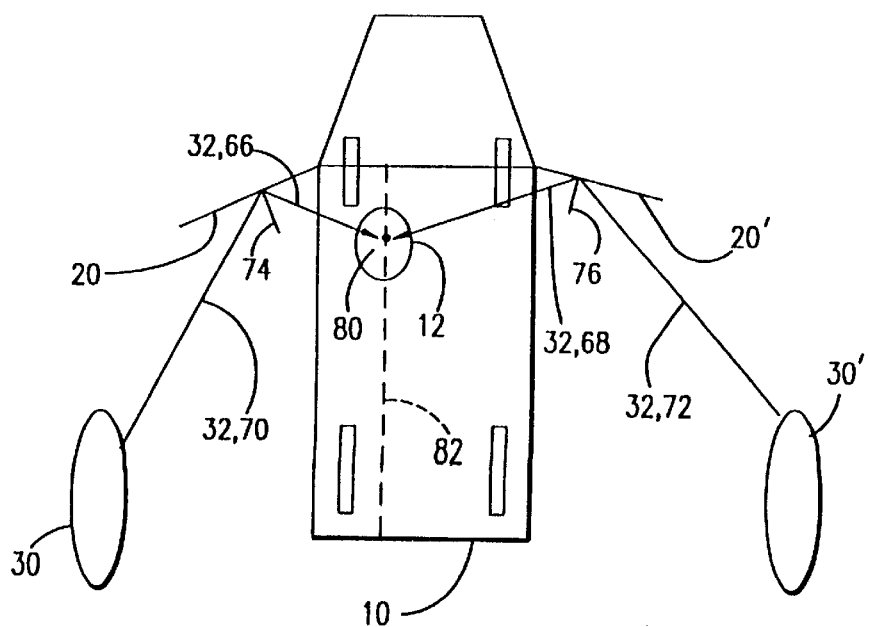
FIG. 8 is a simplified top plan schematic view of correctly aligned sideview mirrors in either the first or second embodiment showing both a left hand and a right hand mirror affixed to the vehicle and the determination of the driver's eye location.
Figure 7:
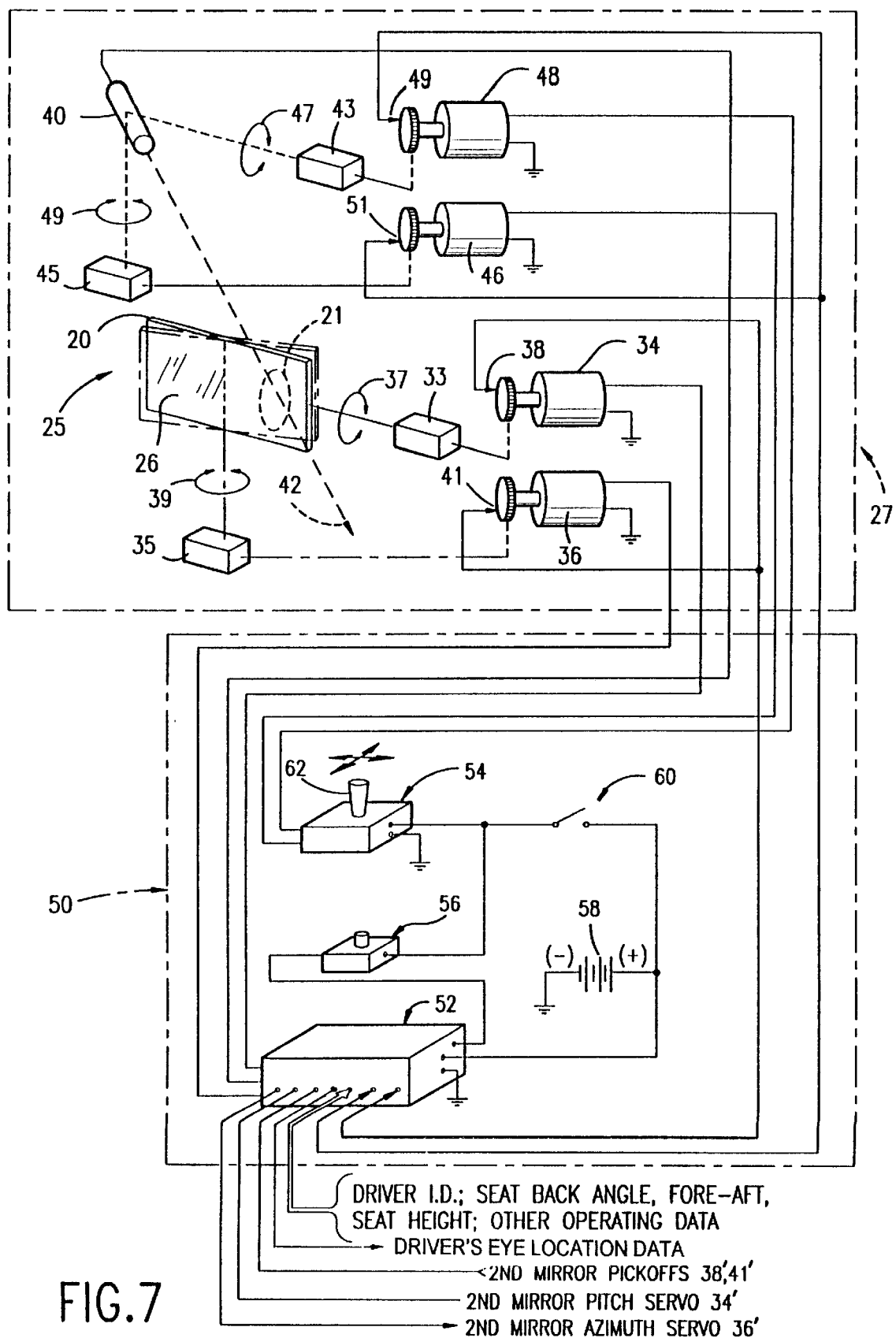
FIG. 7 is a simplified system diagram illustrating a microcomputer-based system for locating the driver's eye location for use in vehicle control systems and for effecting the adjustment of the vehicle sideview mirror assemblies in accordance with the second preferred embodiment of the invention.

Before discussing the second variation of the first embodiment, attention is directed to the first variation of the second preferred embodiment and FIGS. 6–8 wherein a light source 40 is associated with at least one of the vehicle sideview mirrors, as in the first variation of the first embodiment. In this second embodiment, the driver's manipulation of the joystick control 54 of FIG. 7 now directly adjusts the LED 40 (or other light source) light beam 42 direction, not the pitch and azimuth of the sideview mirror 20. In the system illustrated in FIGS. 6 and 7, the LED 40 is mounted for movement about pitch and azimuth axes within a sideview mirror assembly 27 in relation to a selectively light transmissive region 21 of the mirror 20. It should be noted that in a second variation of the second embodiment illustrated in FIGS. 9 and 10 and described in detail below, the LED 40 is mounted for movement about pitch and azimuth axes at a mounting point within the vehicle cabin. In either variation, the system may include a second LED 40' mounted in the other sideview mirror assembly or elsewhere in the vehicle. These systems may be used to derive the driver's eye location, the passenger's eye location or a target location in the passenger's seat. These derived locations may be employed in the derivation of sideview mirror adjustment signals and/or in the control of the vehicle airbag system as summarized above and described in detail below FIG. 6 shows a simplified mirror subassembly 25 of the mechanical components of this first variation of the second preferred embodiment of the invention with the LED 40 incorporated into the mirror subassembly 25 as in the embodiment depicted in FIG. 5. Note in FIG. 6, that the LED 40 is mounted on a set of LED pitch and azimuth gimbals 43 and 45, respectively, rather than directly mounted on the mirror housing 22. Also note that the LED beam 42 is directed toward the driver through the selectively light transmissive region 21 and not reflected off an auxiliary mirror. The latter is not necessary and would only complicate the mathematics involved in this second embodiment. The outer, LED azimuth gimbal 45 permits rotations of the LED 40, and hence LED light beam 42, about a vertical axis 49 to adjust for driver fore-aft seat position. The inner, LED pitch gimbal 43 allows for the LED 40 to be tilted up or down with respect to the driver's eye level about a horizontal axis 47.

In this first variation of the second preferred embodiment, the alignment process is therefore accomplished by first directing the narrow wavelength LED beam 42 through the sideview mirror's selectively transmissive region 21 from the backside and toward the driver. This requires suitable fabrication of the mirror reflective layers in the region shown in dashed lines in FIG. 6 in the same manner as described above. For ease of illustration, the selectively transmissive region 21 is shown off center from the mirror reference point in FIGS. 6 and 7.

Turning to FIG. 7 it will first be described in the context of use for deriving the driver's eye location and properly adjusting the pitch and azimuth angles of the vehicle sideview mirrors. In FIG. 7, when the driver 10 indicates that he/she sees the narrow wavelength LED beam 42 by depressing button 56, the microcomputer 52 solves a set of mathematical equations and/or performs a table look-up operation and uses the resulting position data to drive the mirror servo motors 34 and 36. Servo motors 34, 36 set the pitch and azimuth angles of the mirror 20 in the correct alignment to reflect objects in the vehicle blind spot 30 into the driver's eyes. In this embodiment, the compensations for driver eye level variations and fore-aft seat placement is exact in the resultant mirror follow-up alignment.

The sideview mirror 20 is supported on the two mirror alignment gimbals 33, 35 coupled to the mirror servo motors 34, 36. The LED pitch and azimuth adjustment servo motors 46, 48 track the driver's manual adjustment of control knob 62 to maximize the LED beam intensity at the driver's eyes. The LED pitch and azimuth angle measurement pickoffs 51 and 53 on the LED servo motor gear drives provide LED pitch and azimuth angle feedback signals to the microcomputer 52. The mirror alignment servo motors 34, 36 respond to the microcomputer derived pitch and azimuth mirror drive signals to drive the two mirror gimbals 33, 35 and perform the actual alignment of the sideview mirror 20 with the blind spot.

In particular, the mirror alignment servo motors 34, 36 operate under microcomputer 52 control to align the sideview mirror 20 to the proper pitch and azimuth orientation determined from the final alignment of the LED light beam 42 axis with the driver's eyes. This includes compensating for any shift in the blind spot direction with variations in driver height or fore-aft location of the driver's eyes. To accomplish this compensation, the location of the driver's eyes 80 must be computed in all versions of the second preferred embodiment.

The mirror pitch and azimuth angle measurement pickoffs 38, 41 provide feedback position signals to the microcomputer 52. These feedback control signals provide the microcomputer 52 with the information needed to determine the direction and amount of pitch and azimuth adjustment of the sideview mirror 20 required to achieve optimal mirror alignment with the blind spot 30. The automatic mirror positioning system of FIG. 7 constitutes a closed loop angular positioning servo control system. The LED beam 42 direction is adjusted by the driver via the joystick control 54 as described above. Once the driver sees the LED beam 42, he or she maximizes its intensity by fine tune operating the sideview mirror control knob 62 and then depresses the button 56.

The button switch 56, is typically on the same mirror control joystick 54. This "pickle" button feature is well known in the art of video game hardware design. When the button switch 56 is pressed, the microcomputer 52 removes power from the LED 40 to extinguish the light beam 42. The LED gimbal pitch and azimuth angles, $\Theta_L$ and $\Phi_L$ respectively, are then read out via the pitch and azimuth pickoffs 48 and 51.

The LED gimbal pitch and azimuth angles $\Theta_L$ and $\Phi_L$ are simply the Euler angles, relating a transformation of coordinates between a mirror housing fixed Cartesian coordinate system establishing the mirror azimuth or vertical axis 39 and the mirror pitch or horizontal axis 37 and a second Cartesian coordinate system establishing the LED azimuth or vertical axis 49 and the LED pitch or horizontal axis 47. Given these two Euler angles, the microcomputer 52 is able to compute the three direction cosines $(p_d, q_d, r_d)$ which define a unit vector 66 pointing from a suitable reference origin point on the LED 40, typically at the pivot center of the LED 40, towards the driver's eyes 80. (The corresponding displacement, or distance, vector between the driver's side mirror 20 and the driver's eyes 80, shown in FIG. 8, is simply the linear extension of unit vector 66 and is identified by the same number, 66, in FIG. 8.) Each component of the three element, driver direction cosine vector 66 is the cosine of the angle between the unit vector 66 toward the driver's eyes and the corresponding mirror housing fixed reference axis, i.e. the $X_v, Y_v, Z_v$ vehicle axes using Cartesian axes.

In the practice of the first variation of the second embodiment in its basic form, the location of the driver's eyes 80 is determined as follows. Given the above driver's eye direction cosines determined from the LED gimbal pitch and azimuth angles $\Theta_L$ and $\Phi_L$, a unit vector is constructed from the LED 40 towards the driver 12. This vector is extended mathematically until it intersects a vertical fore-aft seat plane 82 in FIG. 8. To obtain a unique location for the driver's eyes it is only necessary to insure that the mount and axes allowing pitch and azimuth adjustment of the LED light beam 42 are not in the fore-aft seat plane. This is certainly the situation when the alignment LED 40 is located in the exterior sideview mirror assembly 27 and is also the case for many other potential locations for the LED 40 including locations inside the vehicle such as near or on the interior rearview mirror assembly.

In the case of the first embodiment described previously, a similar driver's eye direction cosine vector may be computed given the measured pitch and azimuth angles associated with the sideview mirror 20, after the driver manually aligns the mirror using the fixed LED 40, and given the known fixed angular direction of the alignment light beam 42. This is merely a simple problem in ray optics under plane reflection from the auxiliary mirror 24. In either embodiment, the alignment light beam 42 ends up being directed toward the driver's eyes 80 from a given fixed point relative to the vehicle cabin, i.e., the mirror reference point in the first embodiment and the LED 40 pitch and azimuth axes, more generally, in the second embodiment. The intersection of the linear extension of this unit vector and the fore-aft seat plane 82, in which the driver is assumed to be centered regardless of stature and fore-aft seat position, determines the driver's eye location in vehicle cabin coordinates.

An alternate, related, method of determining the driver's eye location, useful for either embodiment, will be described further below which relaxes even the assumption that the driver sit centered in the fore-aft seat plane. For now, we proceed next to describe how the required sideview mirror angular orientation is determined such that the true blind spot imagery is presented to the driver in the mirror regardless of driver stature or fore-aft seat position. The explanation is in the context of the first variation of the second embodiment, but similar computations must be performed for orienting the sideview mirrors in the case of all variations of either embodiment.

Determination of Correct Mirror Orientation for Either First or Second Embodiments:

The nominal direction cosines of the blind spot axis are known a 'priori for a given mirror mount placement and vehicle model. Any variations due to changes in driver eye height or fore-aft position from nominal can be included in a suitable mathematical model in the vehicle microcomputer 52 dependent on the location of the driver's eyes. This may be installed as a look-up table of changes in blind spot direction cosines from the nominal ones given the changes in drivers eye location from nominal "x,y" locations in the fore-aft seat plane 82. The look-up table can be used to derive the true blind spot direction cosines relative to the center "reference" point of the sideview mirror from the x,y parameters of the driver's eye location.

Let us denote these three true direction cosines to the blind spot by the vector $[p_b, q_b, r_b]$. Again, these direction cosines define a unit vector 70, this time pointing from a vehicle fixed reference or origin point (typically at or very near the center of the mirror) down the axis of the conical volume defining the blind spot 30 and toward the blind spot. (The corresponding displacement, or distance, vector between the driver's side sideview mirror 20 and blind spot 30 shown in FIG. 8 is simply the linear extension of the unit vector 70 and is identified by the same number, 70, in FIG. 8.) Any required small depression angle to account for the fact that a driver usually wishes to see the road surface some distance behind a vehicle centered in the mirror is included in the unit vector 70.

Figure 10:
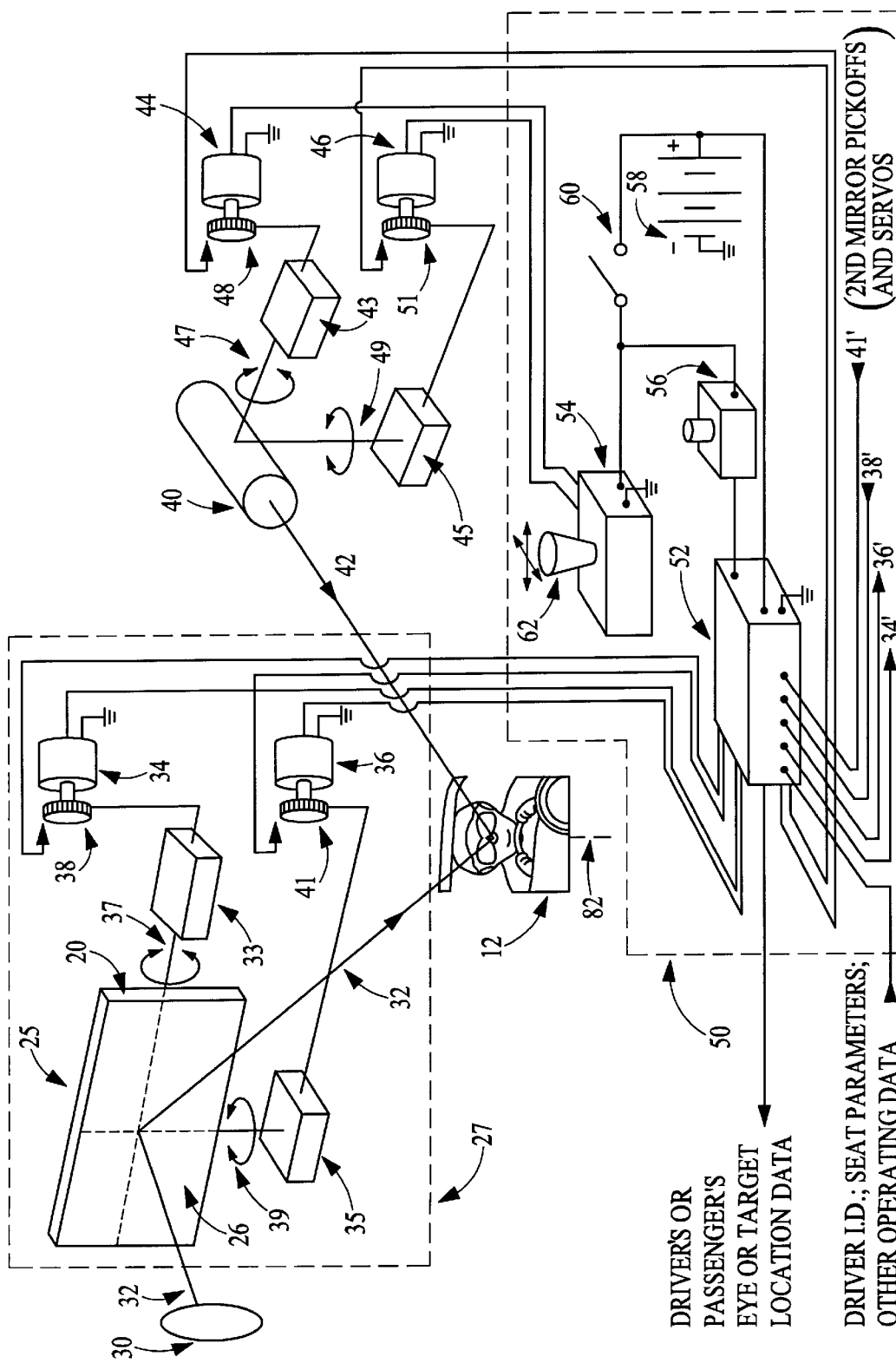
FIG. 10 is a simplified system diagram illustrating a microcomputer-based system for locating the driver's eye location and for adjusting the vehicle sideview mirrors in accordance with the second embodiment of the invention wherein the light source is located in one of the positions illustrated in FIG. 9, for example.

In the case of the first variation of the second embodiment, it is not necessary that the driver direction reference point on the LED 40 be coincident with the blind spot direction reference point on the mirror 20, although this condition does simplify the computation of the required mirror alignment somewhat. In the case of an LED 40 housed in the sideview mirror assembly, the pivot center of the LED 40 can be made much closer to the center and/or azimuth rotation axis of the mirror 20 than shown in FIGS. 6 and 7, so the above assumption can be made valid. For more general locations of the LED 40, it is necessary that the above two sets of direction cosines, i.e. the two unit vectors, be measured with respect to the same vehicle fixed coordinate system. In the general case, it is also important and that any vector displacement between the two reference points (mirror reference point and LED reference point) through which these direction cosine vectors pass be accounted for in the vector mathematics. In many practical implementations of the second embodiment of the present invention, it may be desirable to place the LED 40 inside the vehicle, well removed from the mirror reference point. Examples of such locations for the second variation of the second embodiment are shown in FIGS. 9 and 10 described below.

For either embodiment, the microcomputer 52 then computes or, more simply looks up in a stored look-up table, the required direction cosines associated with the mirror normal vector when the mirror is correctly positioned. This mirror normal vector constitutes yet another unit vector. Let us denote the mirror normal unit vector 74 (herein called the "mirror normal") by the ordered tuple $[p_m, q_m, r_m]$. Being a vector normal to a plane, the mirror normal 74 may be translated freely anywhere over the mirror surface. In particular, it may be placed at the same common origin used for the driver and blind spot direction vectors.

The required three conditions or constraints that allow the three unknown quantities $p_m, q_m, r_m$ to be derived are: (1) that the mirror normal 74 must be in the plane of the incident central ray from the blind spot (approximately known a 'priori and subsequently refined in the microcomputer 52 to accommodate the actual location of the driver's eyes 80) and the reflected central rays 32 heading towards the driver's eyes (collinear with the LED pointing direction in the first variation of the second embodiment); (2) that the mirror normal 74 must bisect the angle formed between the incident and reflected central rays 32, and (3) that the mirror normal 74 has unit length. The first two constraints arise from the properties of plane mirrors and guarantee that the blind spot image will be directed exactly at the driver's eyes, regardless of his or her eye level and fore-aft seat position. The third constraint is a simple property of all unit vectors, namely given two direction cosines of a unit vector the third is automatically defined.

After $[p_m, q_m, r_m]$ are solved for, the corresponding mirror pitch and azimuth Euler angles, $\Theta^M$ and $\Phi_M$, respectively, for the correct mirror position are computed. The fact that only two, rather than three, such angles result is consistent with the fact that rotating a mirror about its normal axis does not change the direction that incident rays are reflected. These angle computations are all straightforward, although nonlinear because of the trigonometric functions involved. As the mathematics involved in either the driver's eye location determination or the optimal mirror orientation determination are well known to those skilled in optical ray tracing and computer analysis of lens and mirror systems, no detailed equations need to be given here.

In some implementations of the first and second preferred embodiments, no equations would actually be solved during sideview mirror alignment. Rather, for all possible observed LED pitch and azimuth gimbal angles, $\Theta_L$ and $\Phi_L$, the corresponding required mirror gimbal angles, $\Theta_M$ and $\Phi_M$ of the correct mirror position for the particular vehicle would be derived a 'priori by the mirror manufacturer and stored in a look-up table in ROM associated with the microcomputer 52. Thereafter, the required mirror gimbal angles, $\Theta_M$ and $\Phi_M$ for the observed LED pitch and azimuth gimbal angles, $\Theta_L$ and $\Phi_L$, would be simply looked up in the ROM look-up table by the microcomputer 52 once the pickle switch 56 is closed by the driver. Practically speaking, this would collapse the two steps of driver's eye location determination and mirror orientation determination into one table operation in both embodiments. However, in other applications, such as controlling air-bag deployment characteristics, explicit determination of the driver's eye location may still be required.

Next, the mirror 20 would be automatically servoed, first about the azimuth (outer) gimbal 35, and second about the pitch (inner) gimbal 33 by pitch and azimuth mirror drive signals generated by the microcomputer 52. The above order assumes a certain convention in defining the Euler angle transformations. A different convention might result in the servoing being conducted first about pitch and then about azimuth. The resultant final mirror 20 orientation would be identical in either case, although the commanded $\Theta_M$ and $\Phi_M$ values would be different.

Regardless of the Euler angle convention adopted, appropriate mirror gimbal angle encoders or pickoffs 38, 41 are employed so that a continuous feedback of the actual mirror angular orientation is returned to the microcomputer 52 during the servo operation. This will insure that the mirror servo motors 34, 36 are run in the correct directions and are stopped when correct alignment is obtained. At completion, the blind spot image is reflected directly into the driver's eyes.

A suitable indicator, such as a green LED, may be momentarily energized to signal to the driver that a condition of proper alignment has been achieved. Another refinement to the second embodiment would be the incorporation of a panel warning light similar to the "door ajar" warning to indicate a malfunction in the alignment aid.

Adjustment of the Passenger's Sideview Mirror Orientation in Both Embodiments:

Before describing in detail the various variations of the first and second embodiments, attention is directed to the adjustment of the passenger's side sideview mirror along with the adjustment of the driver's sideview mirror. In the simplest "baseline", version of the first variation of the first embodiment, each mirror assembly 27 is configured in the manner of FIGS. 4 and 5. Each mirror assembly 27 includes its own LED 40, 40' pointed at its nominal blind zone, and each mirror 20 has its own auxiliary mirror 24 to deviate the light beams 42 and 42' into the driver's eyes as he/she manually adjusts the mirrors 20 and 20'. Similarly, in the simplest, "baseline", version of the first variation of the second embodiment, each mirror assembly 27 would be configured in the manner of FIGS. 6 and 7 and would have its own LED 40, 40' that the driver orients so that he/she sees a maximum light spot intensity in each sideview mirror 20, 20'.

These baseline versions are also described with respect to FIG. 8. It is assumed that the fore-aft seat plane coordinates are known. The driver's eye location is defined for either mirror 20, 20' as the intersection of an extended direction cosine vector (unit vector) from each mirror and the fore-aft seat plane. These vectors are denoted as 66 and 68 in FIG. 8. The microcomputer 52 may be shared with both mirror assemblies and then simply computes the driver's eye location and mirror alignments twice, as the driver signals completion of the manipulation of the control knob for each mirror and then automatically adjusts each sideview mirror 20, 20' to the computed alignments via the appropriate mirror servo motors.

In the baseline version of either embodiment, the driver's eye location is determined for each mirror and used to align that mirror independently of the other mirror. This is possible because only one light source and beam, for example the driver's side sideview mirror light beam 42, and the corresponding distance vector 66, is necessary for the location of the driver's eyes 80 to be computed. This is because the midpoint of the eyes 80 should also lie in the vertical fore-aft seat plane 82 passing through the center of the driver's seat and directed fore-aft in the vehicle 10 if the driver is properly seated behind the steering wheel. The seat plane 82 and mirror subassembly coordinates with respect to the vehicle 10 are known. The extended unit vector from mirror 20 (or 20') to the driver's eyes 80 constitutes a distance vector 66 (or 68) in 3-D space. Since the distance vector 66 (or 68) can intersect plane 82 in at most one point, one can again make use of basic geometry and solve for the location of the driver's eyes 80 where the line and plane intersect. This point is the midpoint location of the driver's eyes 80.

However, it is usually preferred to avoid the expense of incorporating a second LED 40' and associated components in the passenger's side, sideview mirror in the first variations of both the first and second embodiments. Moreover, it may be desirable to simplify the alignment procedure to avoid having to involve the driver in adjusting two sideview mirror mounted light beams in the manner described above. This can be advantageously accomplished, because the driver's eye location can be determined from the measured pitch and azimuth adjustment of the light beam direction accomplished by direct adjustment of the light source (per the second embodiment) or an adjustable light beam reflector intersecting a fixed direction light beam from a fixed light source (per the first embodiment) as described above. The angles of adjustment in pitch and azimuth are measured, and the location of the driver's or passenger's eyes or the target is determined using triangulation techniques employing the measured angles and the known Cartesian coordinates of pitch and azimuth axes of adjustment of the adjustable light source or light beam reflector and the known fore-aft seat adjustment plane for the respective driver's or passenger's front seat.

Once the driver's eye location is determined for the first or driver's sideview mirror in either embodiments the geometry of the vehicle dictates how the second or passenger's side mirror should be aligned. For a range of possible driver's eye locations within the driver's fore-aft seat plane, corresponding sets of mirror pitch and azimuth angle settings can be derived to image the vehicle blind spots for a given vehicle and used to construct a lookup table in memory in the microcomputer 52. Both mirrors may be adjusted from their current pitch and azimuth angles to the required pitch and azimuth angles using the lookup table settings. The second mirror may be then be automatically positioned by mirror pitch and azimuth adjustment signals derived by the microcomputer 52 and applied to the servo motors.

Referring again to FIG. 8, from the final alignment of the mirror 20, the left hand mirror normal 74 represented as a tuple $[p_m, q_m, r_m]$ is derived as described above in regard to the second embodiment. In a like manner, the components of the mirror normal 74 represented as a tuple $[p_m, q_m, r_m]$ can also be derived in the first embodiment employing the microcomputer 52 and pickoffs 38, 41. Then, from the stored body of position data identified above, the right hand sideview mirror normal 76, represented as a tuple $[p_m, q_m, r_m]'$, may be determined for proper alignment of the mirror 20' with respect to the driver's eyes 80 in the fore-aft seat plane 82.

More particularly, first consider the second embodiment of the invention for which the simplification manifests itself most directly. There, knowledge of the location of the fixed reference point for mirror 20 in 3-D space along with knowledge of the direction cosines corresponding to distance vector 66 from mirror 20 to the driver's eyes 80 allows the location of the driver's eyes to be determined in 3-D space as explained for the baseline variation earlier. This is because the midpoint of the eyes 80 should also lie in the vertical fore-aft seat plane 82 passing through the center of the driver's seat and directed fore-aft in the vehicle 10 if the driver is properly seated behind the steering wheel. In turn, knowledge of the location of point 80 and the also fixed reference point for mirror 20' allows distance vector 68 from 20' to 80 to be computed. Given distance vector 68, one can readily compute the direction cosine tuple $[p_d, q_d, r_d]'$ of the corresponding direction vector. Next, since the location 30' of the right hand blind spot is known a 'priori as a function of driver's eye location so is the direction cosine tuple $[p_b, q_b, r_b]'$ defining the displacement vector 72.

Finally, given the direction cosines of displacement vectors 68 and 72 one may solve for the direction cosines of the right hand mirror normal 76 and the corresponding Euler pitch and azimuth angles. This last step uses the same set of equations as employed with the second embodiment.

Servo positioning of the right hand sideview mirror 20' (using mirror angle adjustment measuring pickoffs 38', 41' and pitch and azimuth servo motors 34' and 36' mounted on gimbals 33' and 35' in the passenger's sideview mirror subassembly) can then proceed under control of the microcomputer 52 with no further driver intervention. This is the situation assumed in FIG. 7 where the pitch and azimuth drive signals for the right hand, or passenger's, sideview mirror servo motors are generated by the microcomputer 52 after the left hand, or driver's, exterior mirror adjustment is completed.

For example, the comprehensive version of the first embodiment system depicted in FIG. 5 may be employed to eliminate the need for an LED 40' in the passenger's side sideview mirror 20' and for any driver actions to align this mirror when the driver's side sideview mirror 20 is aligned. Rather, it is possible to derive the approximately correct pitch and azimuth angle positions of the right sideview mirror 20' when the driver signals completion of the manual adjustment of the left sideview mirror 20 such that the light beam 40 is seen to the microcomputer 52.

A Variation of the Derivation of the Driver's Actual Eye Location Applicable to Either the First or Second Embodiments:

FIG. 8 schematically depicts both left and right sideview mirrors 20 and 20' correctly aligned to the driver's eyes 80 to view the blind spots 30 and 30', respectively, in accordance with either of the above embodiments. For each mirror 20, 20', the components of the mirror subassembly 25 and mirror assembly 27, such as the mirror housing 22, LED sources 40, gimbals, servo motors, etc., of FIGS. 1–7, are not depicted in FIG. 8 for simplicity. Only the schematic symbols 20, 20' for the two mirrors along with the appropriate left and right mirror normals 74 and 76, and the associated distance, or displacement, vectors 66, 68, 70, and 72 are depicted. The displacement vectors are simply the linear extensions of the corresponding unit vectors bearing the same identification numbers, as noted earlier.

From FIG. 8, it can be seen that the two distance, or displacement, vectors 66, 68 intersect between the driver's eyes 80. This intersection point defines the exact current location of the driver in the car seat along the fore-aft driver's seat adjustment plane 82, not just a direction to his/her eyes 80. The two distance vectors 66 and 68 represent the straight line extensions of the unit vectors represented by the two direction cosine tuples $[p_d, q_d, r_d]$ and $[p_d, q_d, r_d]'$ from their known origins (at or very near the mirror reference points). By definition, at correct mirror alignment, these two distance vectors 66, 68 must intersect at the midpoint between the driver's left eye and right eye.

In the context of the first variation of the second embodiment where the LEDs 40, 40' are adjustable to directly point at the driver, the distance vector 66 lies along the transmitted light beam 42 emanating from the left mirror center or reference point. The distance vector 68 similarly lies along the transmitted light beam 42' (assuming a LED 40 is actually present in the right sideview mirror subassembly) with respect to the right mirror center or reference point. Refer to FIG. 8 for the following discussion. In this variation for determining the driver's eye location, the right sideview mirror subassembly includes an LED source 40 emitting light beam 42'. The two light beams 42 and 42' are both adjusted by the driver to point at his or her eyes 80 as described above. Then, as also noted above, the point where the two distance vectors intersect is the location of the driver's eyes, 80.

A similar first variation for determining the driver's eye location is also possible with the first embodiment since the microcomputer 52 and pickoffs 38, 41 are employed for that embodiment as well. To understand this, it must be recalled from the above description of the first embodiment and its baseline version that the position Cartesian coordinates for the mirror reference points and pitch and azimuth axes of the mirrors 20, 20' and the associated LED sources 40, 40', and the fore-aft driver's seat adjustment plane 82 are known a 'priori for the specific vehicle and stored in memory in microcomputer 52. Hence, by measuring the pitch and azimuth alignment of the mirror 20, after the driver has manually adjusted the mirror to reflect the fixed light beam into his/her eyes the driver side direction cosines $[p_d, q_d, r_d]$ can be computed from their known origins (at or very near the mirror reference point). Similarly, by measuring the pitch and azimuth alignment of the mirror passenger side mirror 20', after the driver has adjusted that mirror to reflect the fixed light beam into his/her eyes the passenger side direction cosines $[p_d, q_d, r_d]'$ can be computed from their known origins (at or very near the passenger mirror reference point). In turn, the unit vector 66 pointing from the left sideview mirror to the driver's eyes may be solved for mathematically as can the unit vector 68 from the passenger side to the driver. From the two driver's eye unit vectors 66, 68, the actual location of the driver's eyes 80 in the fore-aft seat plane 82 may be determined in this first variation of the first embodiment, just as the driver's eye location may be determined in the second embodiment as described above. In either embodiment with this variation, both sideview mirrors may be subsequently adjusted under computer control to their optimal positions to reflect driver's side and passenger side blind spot imagery into the driver's eyes.

Variations as to the Location of the Light Source(s) of the Second Embodiment:

In the detailed description and illustration of the first variations of the first and second preferred embodiments to this point, the light source(s) 40 is positioned within the mirror housing(s) 22 behind the movable mirror subassembly(s) 25, thereby requiring the selectively transmissive region 21. The present invention contemplates the possibility that the light source(s) 40 may be otherwise positioned and supported fixedly or for movement in pitch and azimuth while performing the same functions as described above. In this regard, there are a number of advantages of removing the light source(s) to location(s) within the vehicle cabin, wherein it or they may be more conveniently used to locate the passenger's eyes or a target in the passenger's fore-aft seat plane.

FIG. 9 illustrates one or two light sources 40, 40' or 40" and the associated light beam direction pitch and azimuth angle adjustment and pickoff components mounted at convenient location(s) inside the vehicle 10. The light sources 40, 40' or 40", for example, can be mounted at some distance(s) outside the fore-aft seat plane 82 at sites that are defined a priori, so that the light beam(s) 42, 42' or 42" direction(s) are not coplanar with the fore-aft seat plane 82 as in FIG. 8. Light source 40" can be mounted, for example, in association with the interior rearview mirror for transmitting a light beam through a semi-transparent region of the movable rearview mirror in the manner of the system of FIG. 7. As described above in reference to FIGS. 7 and 8, the adjustment of the light beam direction(s) to be seen by the driver 12 can therefore be used to derive the left and right sideview mirror pitch and azimuth drive signals.

Turning to FIG. 10, it depicts a system in accordance with this aspect of the invention wherein one of the light source 40, 40' or 40" of FIG. 9 is shown in relation to driver 12 and a driver's side, sideview mirror assembly 27. For convenience, the driver 12 is shown facing forward whereas the driver 12 would actually face into the drawing sheet plane toward light beam 42 and the reflected blind spot light ray 32. The driver 12 manipulates the joystick control 54 to see the light beam 42, the light beam pitch and azimuth angles of adjustment are measured, and the driver's eye location is determined in the manner described above with respect to FIGS. 7–9. The driver's eye location in fore-aft seat plane 82 is then employed to determine the pitch and azimuth drive signals for adjusting the pitch and azimuth settings of the sideview mirrors as described above in reference to FIGS. 7–9.

In the system of FIG. 10, it will be understood that the light source 40 can also be located in relation to the vehicle interior rearview mirror. In this case, the LED 40 and its associated pitch and azimuth adjustment drive motors 44 and 46 and pickoffs 48 and 51 may be located in the mirror housing behind the rearview mirror reflective surface to transmit the light beam 42 through a selectively transmissive region in the manner described above or on the interior rearview mirror housing.

In this variation, the adjustment of the interior rearview mirror by the driver has no effect on the direction of the light beam 42 of FIG. 10. The direction of the light beam 42 is independently adjusted by the driver 12 as described above, and the sideview mirrors are also adjusted in response as described above with respect to FIG. 7. However, it is contemplated in this variation that the spontaneous adjustment of the interior rearview mirror may be sensed by the microcomputer 52 and used to prompt the driver to commence the determination of the driver's eye location and adjustment of the sideview mirrors. Therefore, the light source 40 is illuminated whenever the rearview mirror is adjusted, and the driver is prompted to complete the adjustment until the light beam is seen and to signal the microcomputer that it has been seen.

A Second Variation of the First Embodiment Employing Adjustment of the Vehicle Interior Rearview Mirror:

In a still further variation of the system of the first embodiment depicted in FIG. 5, it is contemplated that the manual adjustment of the interior rearview mirror may be itself employed to derive the driver's eye location and to derive sideview mirror adjustment signals. In this variation, the microcomputer-based mirror adjustment and driver's eye location system of FIG. 5 does not employ the light source pitch and azimuth servo motors 44, 46 and joystick control 54. The light source 40 is located in relation to the interior vehicle rearview mirror so that the adjustment of the mirror reflects the light beam direction 42. The rearview mirror is mounted to a mount allowing it to be manually adjusted in pitch and azimuth, and the pitch and azimuth pickoffs 48 and 51 are provided to measure its adjustment. The rearview mirror is adjusted to pitch and azimuth angles that allow the light beam 42 to intersect the driver's eyes 80 in the fore-aft seat plane 82. The driver's eye location are then determined from the measured, adjusted pitch and azimuth angles. Sideview mirror pitch and azimuth drive signals are then derived and employed to set the pitch and azimuth of the sideview mirror(s) in the manner described above with respect to FIG. 10, for example. This system may also be used to determine the passenger's eye location or the location of the target in the passenger's fore-aft seat plane.

One example of such a further variation of the first embodiment is illustrated in FIGS. 11–15. In this variation, a light beam 142 is fixed with respect to the interior rearview mirror 120, and the direction of a reflected light beam 142' is adjusted in pitch and azimuth by the adjustment of the interior rearview mirror 120. This variation incorporates a doublet auxiliary mirror 124 and the principles of operation of portions of both the first and second embodiments. This variation enjoys the advantage of being completely located inside the passenger compartment of the vehicle 10 and being likely to be used by the driver 12 whenever the interior rearview mirror 120 is adjusted. Pitch and azimuth angle pickoffs 138 and 141 are coupled to the rearview mirror gimbal mechanism 104 in order to provide pitch and azimuth signals that are employed to determine the driver's eye location and to determine the sideview mirror adjustment signals. Through optical relationships illustrated in these figures, the adjustment of the interior rearview mirror 120 to make the reflected light beam 142' visible to the driver 12 also results in proper adjustment of the rearview mirror 120 to reflect an image of the rearward scene 130 visible through the vehicle rear window 110.

Figure 11:
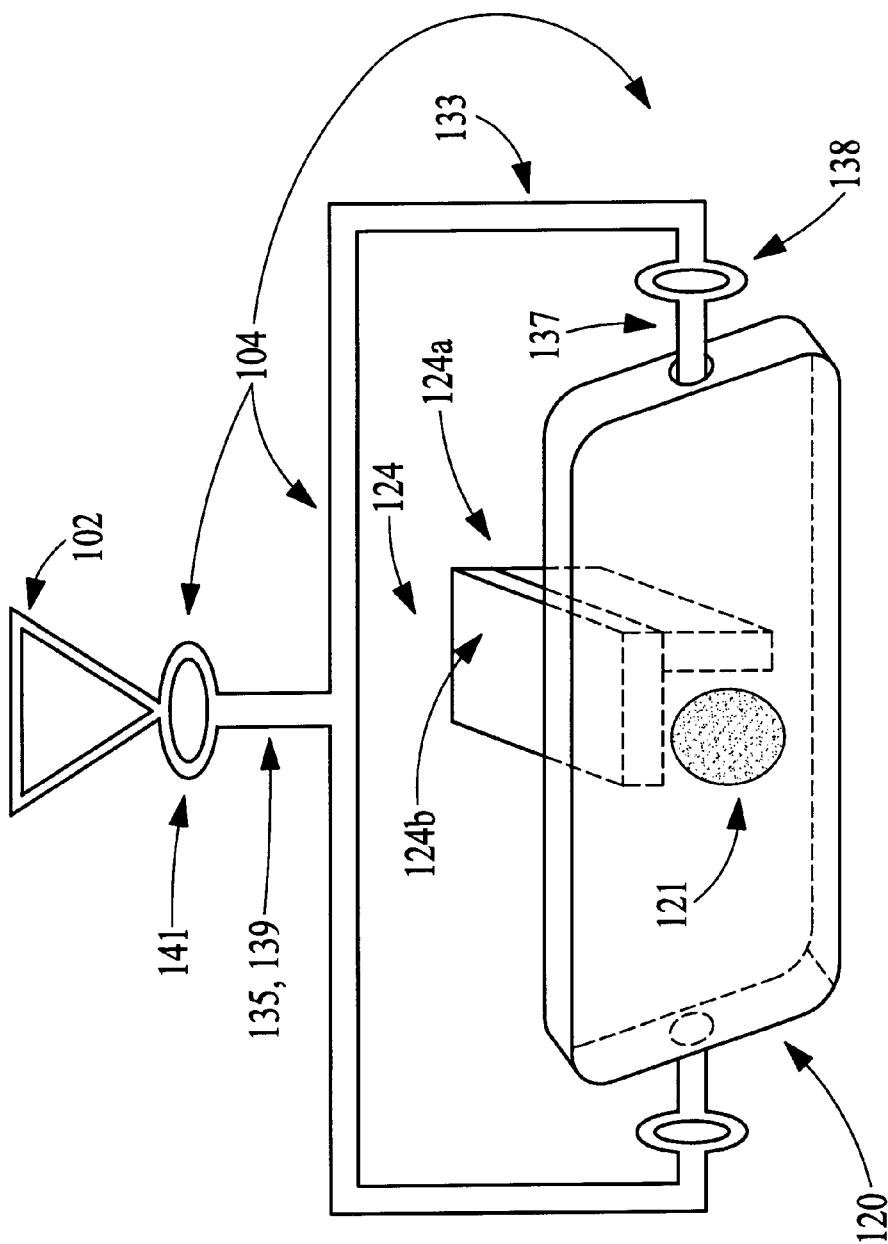
FIGS. 11 and 12 are simplified diagrams of a doublet auxiliary mirror for reflecting a fixed light beam into a driver's eyes mounted in relation to the vehicle interior rearview mirror and pitch and azimuth pickoffs mounted to the rearview mirror gimbal mechanism for measuring the pitch and azimuth mirror angles of adjustment causing the light beam to be reflected into the driver's eyes.
Figure 12:
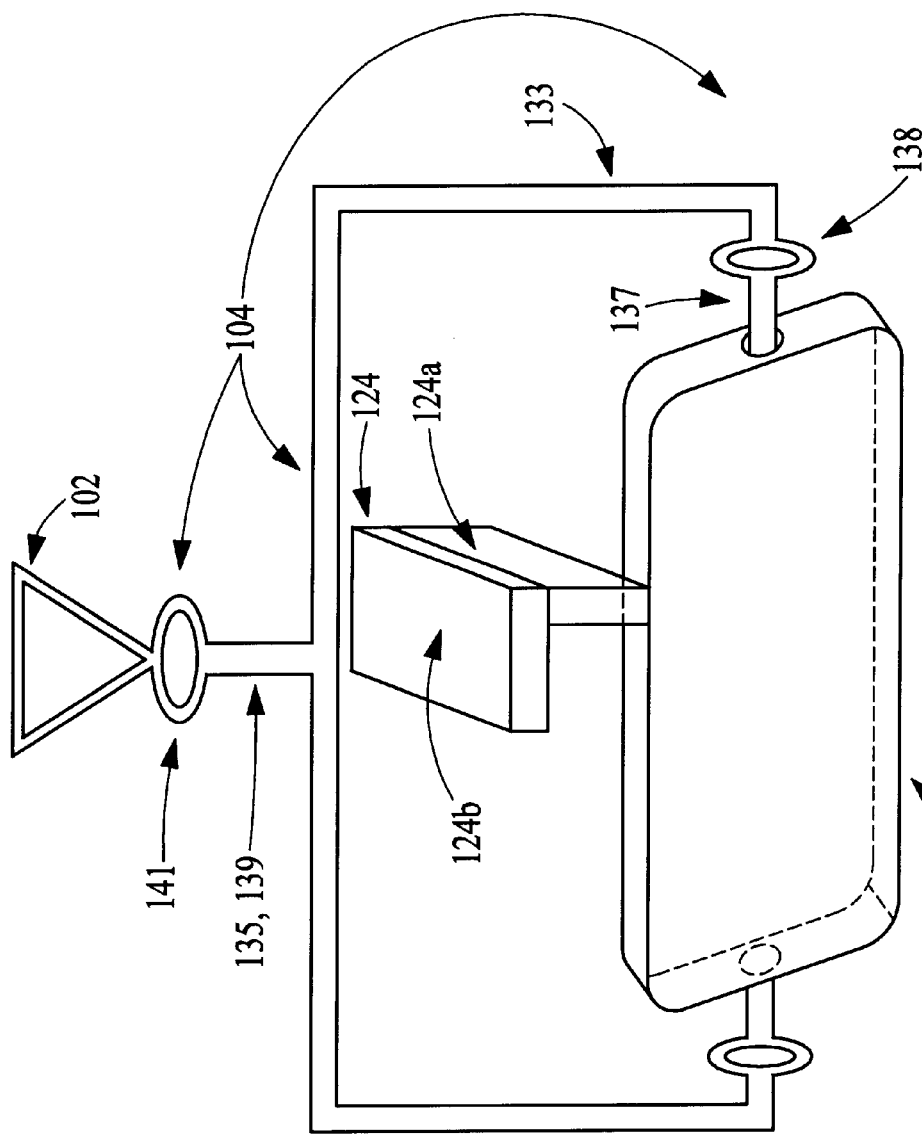

In FIGS. 11 and 12, the doublet auxiliary mirror 124 comprises a micro-miniaturized azimuth reflective mirror surface 124a and a pitch reflective mirror surface 124b that are mounted at right angles to one another. In FIG. 11, the doublet auxiliary mirror 124 is mounted directly behind the rearview mirror reflective surface 126 in fixed relation to a selectively transmissive region 121 of the type described above. In FIG. 12, the doublet auxiliary mirror 124 is mounted directly to the mirror edge or frame to be moved with rearview mirror 120.

The rearview mirror 120 is mounted for manual or remote motorized adjustment about the pitch and azimuth mirror axes 139 and 137 employing a typical rearview mirror gimbal mechanism 104. The rearview mirror gimbal mechanism 104 includes a rearview mirror azimuth gimbal 135 defining the azimuth mirror axis 139 and a rearview mirror pitch gimbal 133 defining the pitch mirror axis 137.

Figure 13:
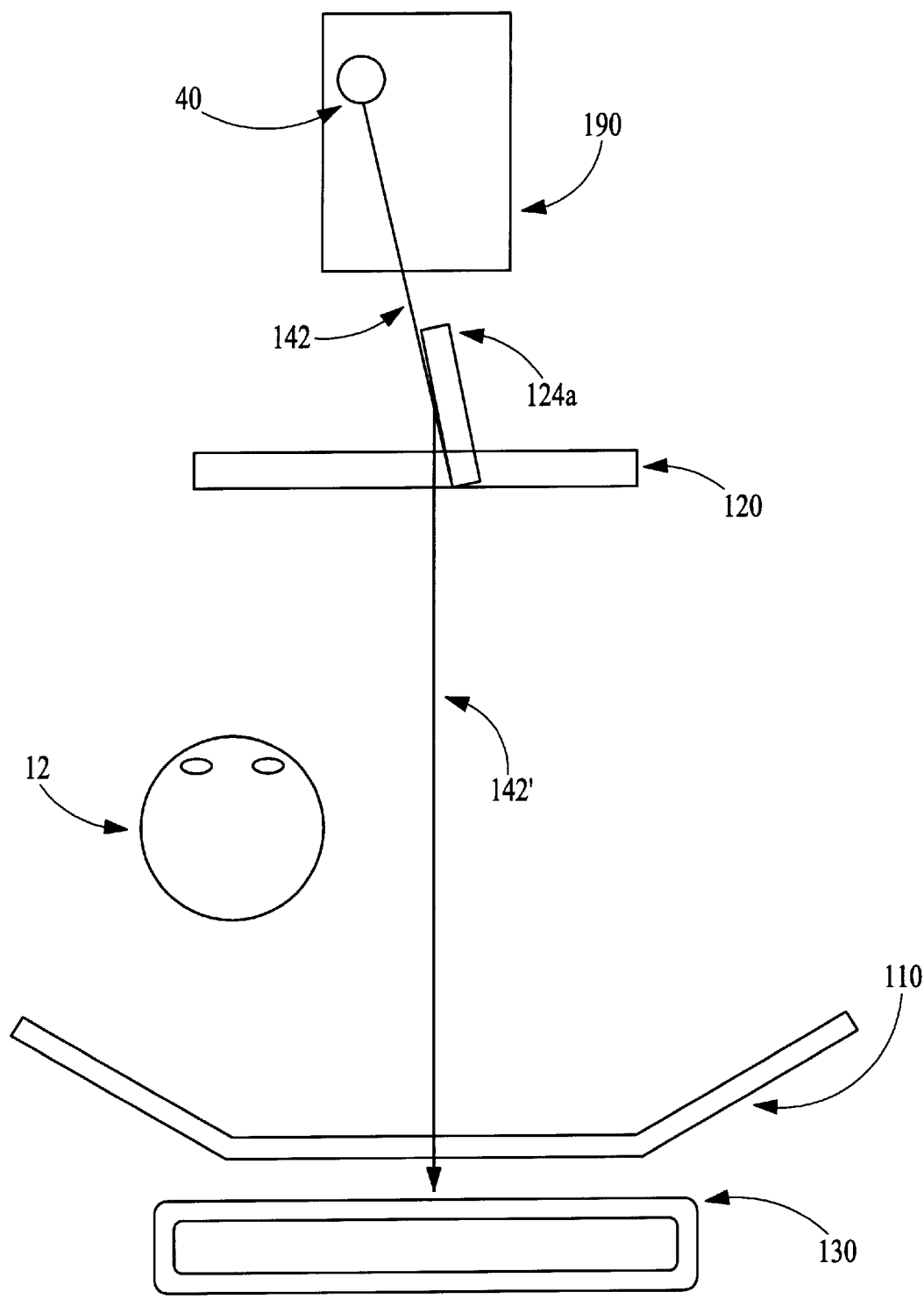
FIGS. 13 and 14 are simplified illustrations of the direction of the light beam and reflected image of the rearward scene into the driver's eyes with azimuth adjustment of the rearview mirror.
Figure 14:
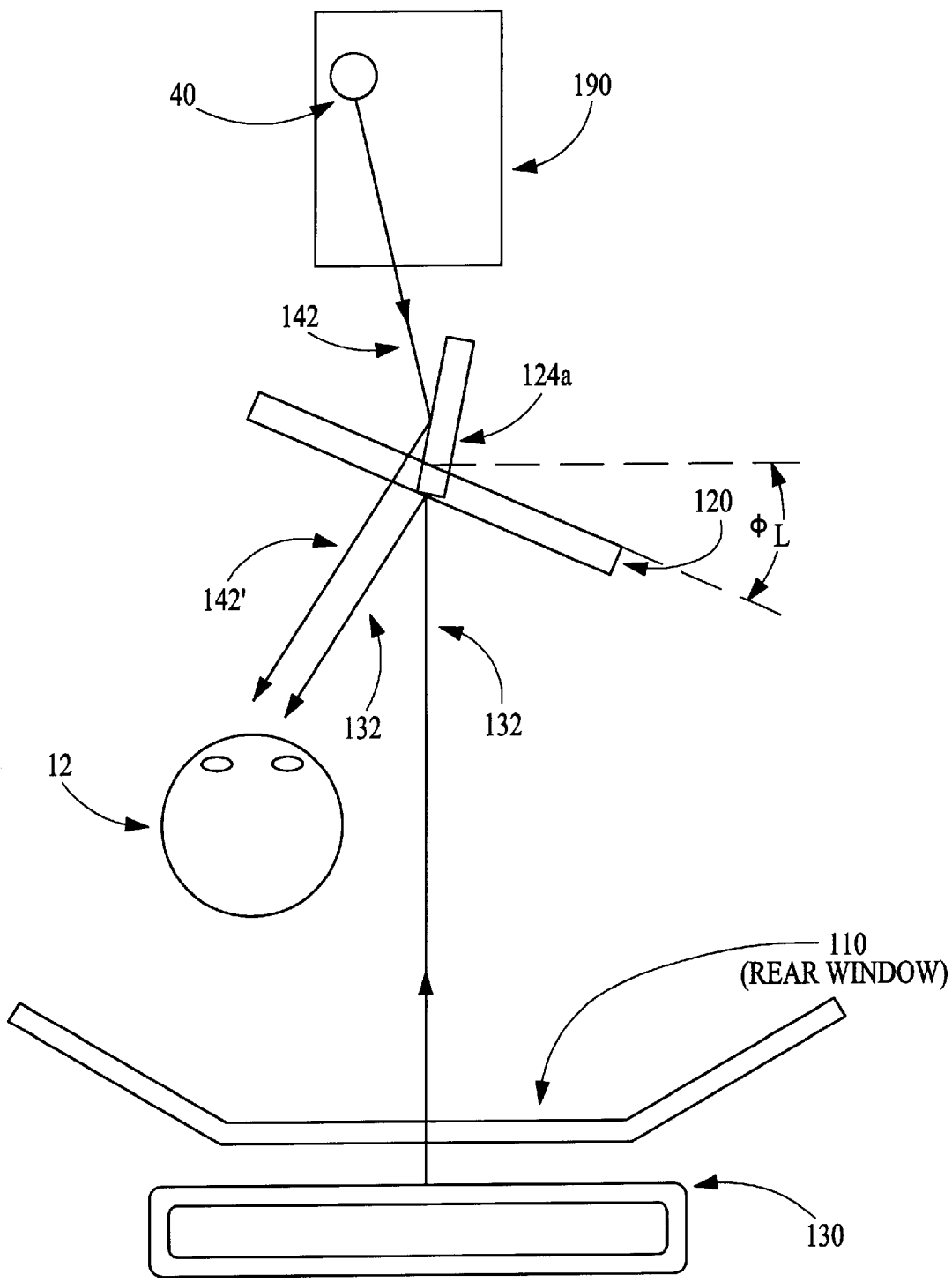

In FIGS. 13 and 14, the adjustment in azimuth of the rearview mirror 120, so that light rays 132 of the image of the rearward scene 130 passing through rear window 110 are optimally viewed by the driver 12 located in the fore-aft seat plane 82, is illustrated. The light beam 142 is emitted in a fixed light beam direction either directly from a light source 140 located forward of the rearview mirror 120 or indirectly off a fixed mirror located forward of the rearview mirror 120. In these illustrations, it is assumed that the rearview mirror 120 is mounted by rearview mirror gimbal mechanism 104 in the vehicle fore-aft centerline, as is typically the case. If this is not the case, the directions of the light beam 142 and the normal pitch and azimuth angles described below can be adjusted to compensate for the location of the mirror mount 102 and/or mirror gimbal mechanism 104.

In FIG. 13, the pitch mirror surface 124b is not shown for convenience of illustration. The fixed direction of light beam 142 forward of rearview mirror 120 is angled so that it reflects off the azimuth surface 124a near its root with the reflective surface 126 in all azimuth positions of the rearview mirror 120. In reference to FIGS. 11 and 12, the reflected light beam 142' is either directed alongside the rearview mirror 120 or through the selectively transmissive region 121.

As shown in FIGS. 13 and 14, the azimuth surface 124a is mounted so that it is not necessarily at 90° to the rearview mirror surface 126. The specification of the precise mounting angle of azimuth surface 124a with respect to the plane of reflective mirror surface 126 depends on a number of vehicle specific factors and the chosen fixed angle of the light beam 142 striking it.

The reflected light beam 142 is directed rearward approximately in alignment with the vehicle fore-aft centerline axis and vertical plane and in coincidence with the rearward scene light rays 132 when the reflective mirror surface 126 is at the nominal 0° azimuth adjustment. Consequently, the nominal 0° azimuth adjustment is defined as the perpendicular, in azimuth, orientation of the reflective mirror surface 126 to the vehicle fore-aft seat plane 82. Thus, the reflected light beam 142' is directed approximately through the center of the rear window 110 as long as the rearview mirror 120 is at 0° azimuth. In the nominal rearview mirror azimuth position, the driver 12 can neither see the reflected light beam 142' nor optimally see the rearward scene 130. The rear image light rays 132 from the rearward scene 130 are reflected straight back in this rearview mirror azimuth position.

Turning to FIG. 14, the rearview mirror 120 is shown adjusted in azimuth so that the reflected light beam 142' is directed into the driver's eyes 80. The azimuth adjustment is directly proportional to the fore-aft location of the driver's eyes in the fore-aft seat plane 82. This azimuth adjustment of rearview mirror 120 also reflects the reflected rear image light rays 132' into the driver's eyes in substantial coincidence with the reflected light beam 142'.

Figure 15:
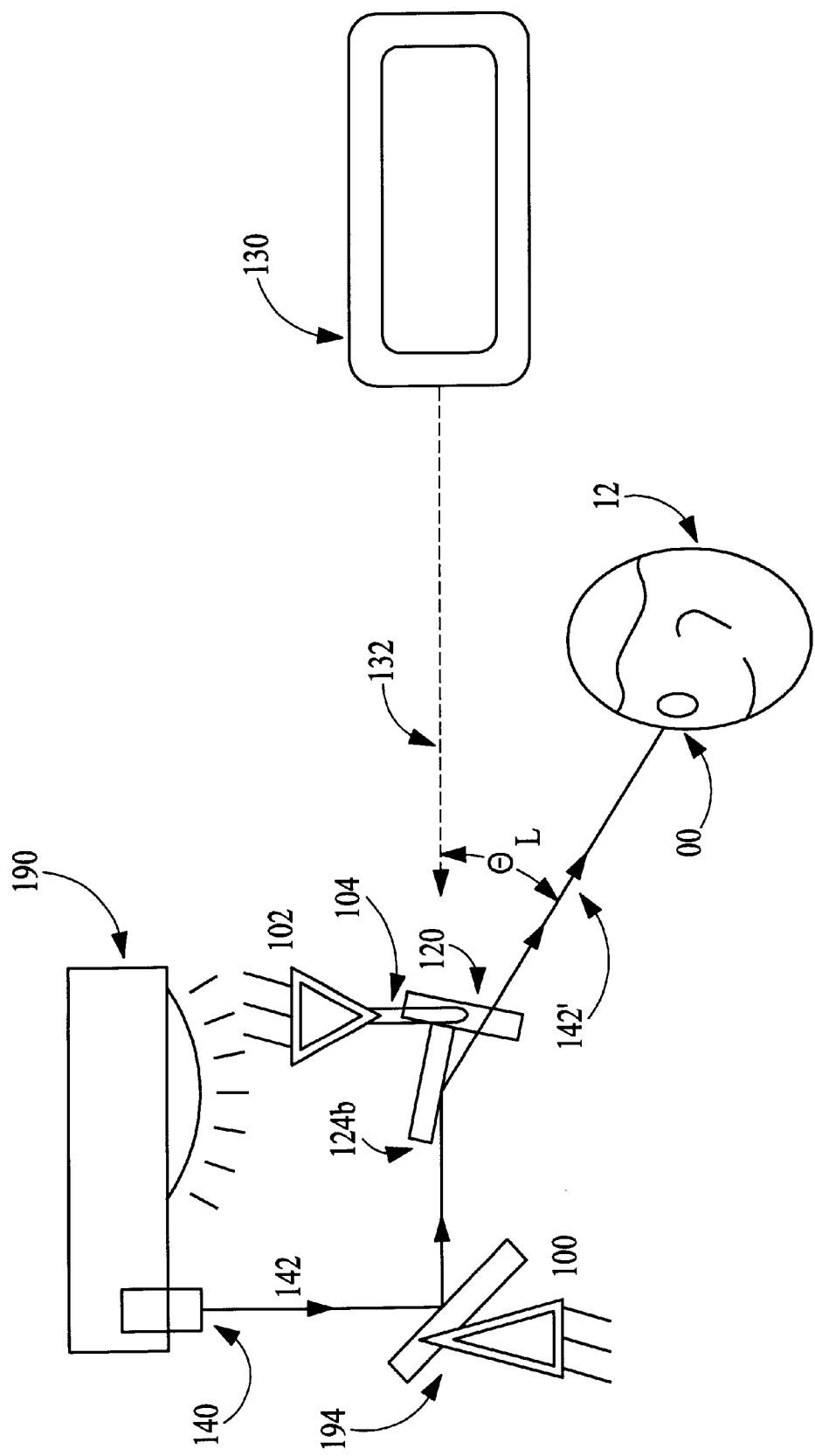
FIG. 15 is a simplified illustration of the direction of the light beam and reflected image of the rearward scene into the driver's eyes with pitch adjustment of the rearview mirror.

The rearview mirror 120 also must be adjusted in pitch to compensate for the driver's eye height of the driver 12 in the fore-aft seat plane 82, so that the driver 12 can see the reflected light beam 142' and optimally view the reflected image of the rearward scene 130. The locations of the driver 12 (assumed to be in the fore-aft seat plane 82) and the driver's eyes 80 in a horizontal, up-down plane 84 are illustrated in FIG. 15. The pitch surface 124b is normally at 90° to the azimuth surface 124a.

Typically, the rearview mirror 120 is located above the driver's eyes 80, assuming that the driver 12 locates the seat height to a comfortable position where his/her head does not contact the vehicle roof When the rearview mirror reflective surface 126 is perfectly perpendicular or at some other preset pitch angle, a nominal rearview mirror pitch, designated 0°, is defined. This nominal pitch typically would not allow the driver 12 to see optimally through the center of the rear window 110. In this nominal pitch position, the light beam 142 is not reflected from pitch surface 124b.

In the typical range of fore-aft and up-down locations of the driver's eyes 80, the rearview mirror 120 is tilted in pitch from the nominal pitch angle, and the light beam 142 is also reflected from the pitch surface 124b. One such pitch position and the driver's eyes location are depicted in FIG. 15. In the illustrated pitch adjustment of the rearview mirror 120, the reflected rear image light rays 132' are also directed to the driver's eyes 80. The deviation in pitch angle from the nominal 0° angle by pitch gimbal angle $\Theta_L$, that allows the driver 12 to see the reflected light beam 142' and the image of the rearward scene 130 is measured by the pitch angle pickoff 138 (FIGS. 11 and 12).

This variation of the invention may be implemented to determine the driver's eye location and to adjust the vehicle sideview mirrors employing the other components and methodology of FIG. 10. In this case, the LED pitch and azimuth servo motors 44 and 46 and associated motor drive signal generating functions initiated by use of the joystick control are eliminated. The rearview mirror pitch and azimuth angle pickoffs 138 and 141 are coupled to the microcomputer 52. The driver is prompted by any of the known prompts to adjust the interior rearview mirror and expect the adjustment of the sideview mirrors upon starting the engine, adjusting the seat position, spontaneously adjusting the interior rearview or exterior sideview mirrors, etc. Assuming that both the pitch and azimuth adjustments are completed, the driver 12 initiates the determination of his/her eye location and/or the adjustment of the vehicle sideview mirrors by providing a signal to the microcomputer 52 in the manner described above in reference to FIGS. 7 and 10 indicating that he/she can see the reflected light beam 142'.

When the driver signals that he/she can see the reflected light beam 142, the azimuth gimbal angle $\Phi_L$ from the normalized or 0° azimuth angle shown in FIG. 13 is measured by the azimuth angle pickoff 141, thereby developing a measured azimuth angle of adjustment signal that is applied to the microcomputer 52, as in the systems of FIGS. 7 and 10. The microcomputer 52 determines the fore-aft location of the driver's eyes 80 in the fore-aft, vertical seat plane 82 from the measured azimuth angle of adjustment signal and from the Cartesian coordinates of the fore-aft seat plane 82 and the rearview mirror 120 about the rearview mirror pitch and azimuth axes 139 and 137 as described above in regard to FIG. 7.

Similarly, the driver's vertical eye location, i.e., the horizontal plane 84 coordinates, is derived by the microcomputer 52 from the fore-aft location of the driver's eyes 80 in the fore-aft, vertical seat plane 82 and the measured pitch angle of adjustment signal.

As described above, the driver's eye location data may be used for a variety of purposes including the adjustment of the vehicle sideview mirrors to reflect the image of the vehicle blind spots. Continuing with the adjustment of the sideview mirrors, the microcomputer 52 derives an azimuth sideview mirror positioning signal for either or both of the driver's side and passenger's side sideview mirrors from the measured azimuth angle of adjustment of the reflected light beam 142 and from the Cartesian coordinates of the fore-aft seat plane 82, the respective vehicle side blind spot for each such sideview mirror, and the respective sideview mirror pitch and azimuth axes 39 and 37 as described above in regard to FIGS. 7 and 10. Then, the respective azimuth sideview mirror positioning signal is employed to align the respective sideview mirror to reflect the image of the respective vehicle side blind spot into the driver's eyes. In a similar fashion, the respective pitch sideview mirror positioning signals are derived and employed to adjust the pitch of the respective sideview mirrors.

Returning to FIG. 15, it also depicts one further location for a light source 140 in association with a vehicle headliner assembly 190 typically including a set of interior lamps and located above and frequently rearwardly of the rearview mirror mount 102. The light source 140 emits the light beam 142 downward and possibly forward to a fixed reflector or mirror 94 that reflects the light beam 142 into the fixed light beam path illustrated in FIGS. 13 and 14, for example.

Figure 16:
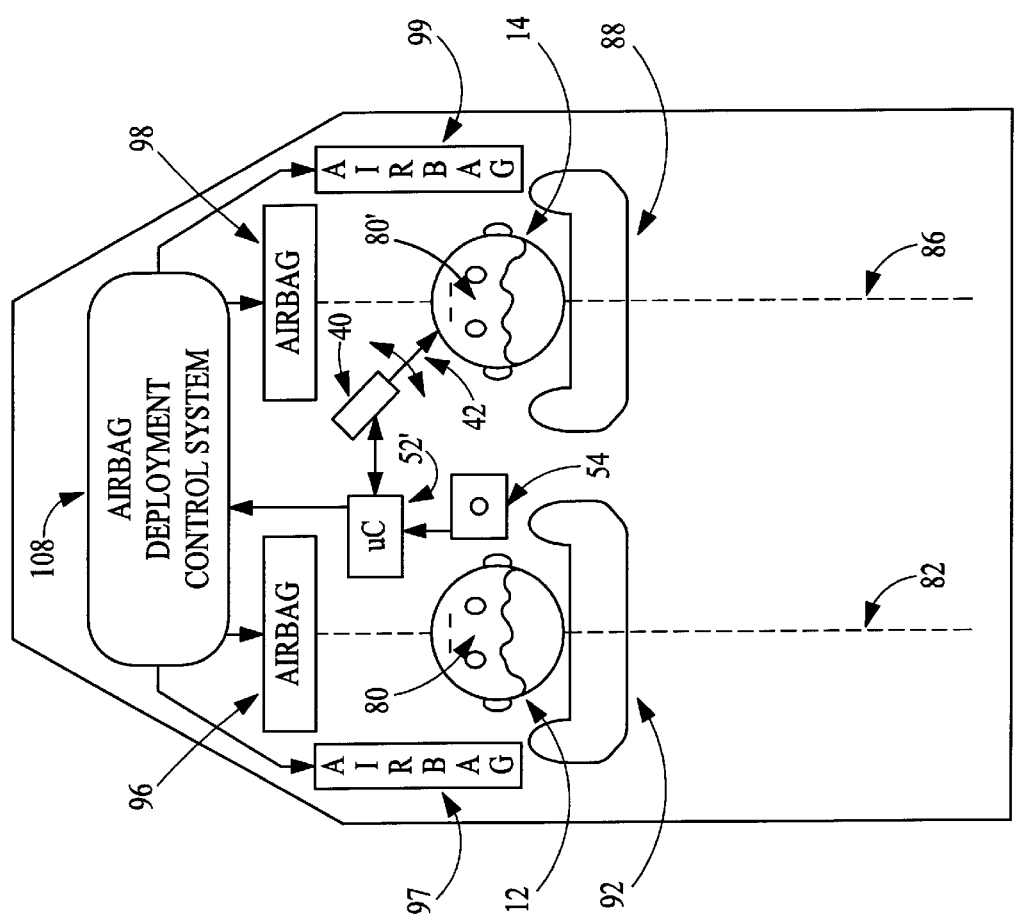
FIG. 16 schematically illustrates a system for locating the driver or the front seat passenger or infant seat and for controlling airbag deployment force and duration as a function of the determined locations.

Locating the Passenger's Eye or Infant Seat Position:

The above-described embodiments of FIGS. 7–15 may be modified as shown in FIG. 16 to derive a target of a vehicle occupant other than the driver, e.g., the eye location of a passenger 14 in the vehicle front passenger's seat 88 or a location of an infant's seat in the passenger's seat 88. Moreover, the data identifying the location of the driver's eyes 80 and the passenger's eyes 80' or the infant seat, etc., may be employed to vary the characteristics of airbag deployment of the vehicle airbag(s) for each vehicle seat. FIG. 16 comprehensively illustrates both of these variations of the present invention for airbags located to protect occupants of the front seats.

In order to initiate the operations to derive the location of the driver's eyes 80 or the passenger's eyes 80' or infant seat, it is necessary to provide an identification signal through a button switch or the like to the microcomputer 52' identifying which seat location is being sought. The location may be effected employing components and functions described in respect to the embodiments of FIGS. 7–15 in each of the above-described systems. In regard to location of a target of an occupant or infant's seat in the passenger's seat 88, the direction of the light beam 42 may be adjusted in pitch and azimuth by the driver or the passenger 14, if the passenger is capable of doing so, until it is seen by the passenger 14 or the light beam spot can be seen by the driver striking a target, e.g. a designated target on an infant seat strapped into front passenger's seat 88. The light beam pitch and azimuth adjustments may be effected by movement of the light source itself or a reflector located in the light beam path, e.g. a doublet auxiliary mirror or the like by adjustment of the joystick control 54. The system of FIGS. 11–15 can be used if it is provided with a sufficient pitch and azimuth adjustment range to be directed upon small stature passengers.

Then, the pitch and azimuth angles of adjustment are measured from the pitch and azimuth pickoffs coupled to the pitch and azimuth adjustment axes of the adjustable light source or light beam reflector. The location of the passenger's eyes 80' or the infant seat is derived by the microcomputer 52' in the manner described above, employing the known Cartesian coordinates of the adjustable light source or light beam reflector and the fore-aft passenger seat plane 86.

Control of Airbag Deployment Characteristics:

In a further application of the present invention, the derived locations of the driver's eyes, the passenger's eyes or the location of a target of an occupant or infant's seat are used to determine the distance between the airbag and the same, and the distance is used to control the characteristics of deployment of the airbag. The controlled characteristics of deployment of the airbag to account for the determined distance comprise one or more of the airbag inflation force, the rate of inflation and the inflation duration.

In regard to control of the driver's side airbags 96 and 97, the driver's eye location is derived in any of the manners described above. The microcomputer 52' is modified to derive driver's side airbag inflation force, rate and duration control signals using an appropriate look-up table, for example, tailored to the particular vehicle seating configuration, airbag locations and types and other appropriate factors. The airbag inflation force, rate, and duration control signals are applied to the airbag deployment force and duration control system 108 which in turn controls the deployment of the airbags 96, 97 accordingly.

Similarly, once the location of the passenger's eyes 80' or the location of an infant's seat is determined, the microcomputer 52 calculates an adjustment in the inflation force, rate of inflation, and inflation duration of the passenger's side airbags 98 and 99. The airbag force and duration adjustment signal is applied to the airbag deployment system, particularly to the airbag deployment force and duration control system 108 which in turn controls the deployment characteristics of the airbags 98, 99.

Many of the considerations to be taken into account and a system block diagram for making the airbag deployment decision and controlling the inflation force and duration or rate of inflation of single stage or multi-stage airbags are set forth in the above-referenced article entitled "Restraint system electronics", incorporated herein by reference. After the driver or passenger or infant seat target is located in accordance with the present invention, the distance between the same and the respective airbag(s) may be determined, and the airbag deployment controlled in the manner described therein. In this article, a variety of sensors are described for attempting to determine the position of the driver, passenger(s) and infant seat and other vehicle characteristics, e.g. vehicle speed and the like, that provide signals that are proposed to be combined to control the deployment of airbag(s). In this regard, the determination of the driver's eye location, the passenger's eye location and the child target or the infant seat target of the present invention may be employed in conjunction with the signals derived from these sensors in order to more accurately confirm the position of each.

Final Comments

In the above description and the following claims, no requirements will be made on the microcomputer as to whether it is a general purpose or special purpose unit and whether it is integrated in the mirror hardware or not. The microcomputer may be a general purpose vehicle microcomputer, used for other functions such as computing gas mileage computation or climate control, or a special purpose processor or computer, strictly dedicated to the mirror alignment functions described in this application. The general adjectives "vehicle", "on-board" and/or "integrated" covers all locations and types of microprocessors or microcomputers used by the mirror blind spot reduction technology described herein. If an integrated microcomputer is employed in either the first or second embodiments, it may be located in one or both of the mirror housings and included by the mirror manufacturer as part of the delivered unit.

While a number of preferred embodiments of the invention and variations thereof have been described in detail, other modifications and methods of using or implementing the same will be apparent to those of skill in the art. Accordingly, it should be understood that various applications, modifications, and substitutions may be made of equivalents without departing from the spirit of the invention or the scope of the claims.

What is claimed is:

1. In a vehicle operated by a driver and having a plurality of vehicle mirrors comprising a first vehicle mirror and at least one further vehicle mirror, a method of adjusting the plurality of vehicle mirrors to reflect rearward views to the driver's eyes comprising the steps of:

detecting an action of the driver related to the desirability of adjusting the vehicle mirrors;

issuing a prompt in response to the detected action of the driver that prompts the driver to adjust the first vehicle mirror, indicating to the driver when the first vehicle mirror is correctly adjusted to reflect the optimal rearward view to the driver's eyes;

determining a mirror adjustment signal for each further vehicle mirror from the adjustment of the first vehicle mirror; and adjusting each further vehicle mirror using the determined mirror adjustment signal.

2. The method of claim 1, wherein the detecting step further comprises detecting the adjustment of any vehicle mirror by the driver.

3. The method of claim 1, wherein the detecting step further comprises detecting a change in the driver's seat position.

4. The method of claim 1, wherein the detecting step further comprises detecting the starting of a vehicle engine.

5. The method of claim 1, wherein the first vehicle mirror comprises an interior rearview mirror and the issuing step further comprises the step of:

issuing a prompt that prompts the driver to adjust the interior rearview mirror until an indication of correct adjustment is indicated to the driver.

6. The method of claim 1, further comprising the step of:

providing a light source at a vehicle light source position that is selectively energizable to emit a light beam in an adjustable light beam direction; and wherein:

the issuing step further comprises the steps of:
      energizing the light source in response to the detected action of the driver; and
      prompting the driver to adjust the light beam direction until the light beam is visible to the driver's eyes.

7. The method of claim 1, further comprising the step of:

providing a light source at a vehicle light source position that is selectively energizable to emit a light beam in a light beam direction that is deflectable with adjustment of the first vehicle mirror; and wherein:

the issuing step further comprises the steps of:
      energizing the light source; and
      prompting the driver to adjust the first vehicle mirror until the light beam is visible to the driver's eyes;

the indicating step further comprises deflecting the light beam into the driver's eyes upon adjustment of the first vehicle mirror to a mirror adjustment that reflects the optimal rearward view; and the step of determining mirror adjustment signals further comprises determining a mirror adjustment signal for each further vehicle mirror from the adjustment of the first vehicle mirror when the light beam is visible to the driver.

8. The method of claim 7, wherein the vehicle mirrors include an interior rearview mirror and the first vehicle mirror is the interior rearview mirror.

9. The method of claim 7, wherein the detecting step further comprises detecting a change in the driver's seat position.

10. The method of claim 7, wherein the detecting step further comprises detecting the starting of a vehicle engine.

11. The method of claim 7, wherein the detecting step further comprises detecting the adjustment of any of the plurality of vehicle mirrors by the driver.

12. The apparatus of claim 11, wherein:

the prompting means further comprises a light source at a vehicle light source position that is energized in response to the detected action of the driver to emit a light beam in an adjustable light beam direction; and the indicating means further comprises means for deflecting the light beam until the light beam is visible to the driver.

13. In a vehicle operated by a driver and having a plurality of vehicle mirrors comprising a first vehicle mirror and at least one further vehicle mirror, apparatus for adjusting the plurality of vehicle mirrors to reflect rearward views to the driver's eyes comprising:

means for detecting an action of the driver related to the desirability of adjusting the vehicle mirrors;

prompting means responsive to the detected action for issuing a prompt to the driver to adjust the first vehicle mirror;

means for indicating to the driver when the first vehicle mirror is correctly adjusted to reflect an optimal rearward view to the driver's eyes;

means for determining a mirror adjustment signal for each further vehicle mirror from the adjustment of the first vehicle mirror; and means for adjusting each further vehicle mirror using the determined mirror adjustment signal.

14. The apparatus of claim 13, wherein the detecting means further comprises means for detecting the adjustment of any of the plurality of vehicle mirrors by the driver.

15. The apparatus of claim 13, wherein the detecting means further comprises means for detecting a change in the driver's seat position.

16. The apparatus of claim 13, wherein the detecting means further comprises means for detecting the starting of a vehicle engine.

17. The apparatus of claim 13, wherein the first vehicle mirror comprises an interior rearview mirror and the prompting means further comprises means for issuing a prompt that prompts the driver to adjust the interior rearview mirror until an indication of correct adjustment is indicated to the driver by the indicating means.

18. The apparatus of claim 13, wherein:

the prompting means further comprises a light source that emits a light beam in response to the detected action of the driver;

the indicating means further comprises means for deflecting the light beam by adjustment of the first vehicle mirror until the light beam is visible to the driver; and the determining means further comprises means for determining a mirror adjustment signal for each further vehicle mirror from the adjustment of the first vehicle mirror when the light beam is visible to the driver.

19. The apparatus of claim 18, wherein the vehicle mirrors include an interior rearview mirror and the first vehicle mirror is the interior rearview mirror.

20. The apparatus of claim 18, wherein the detecting means further comprises means for detecting the adjustment of any of the plurality of vehicle mirrors by the driver.

21. The apparatus of claim 18 wherein the detecting means further comprises means for detecting a change in the driver's seat position.

22. The apparatus of claim 18, wherein the detecting means further comprises means for detecting the starting of a vehicle engine.

* * * * *